(12) United States Patent
Rudy et al.

(10) Patent No.: US 8,291,054 B2
(45) Date of Patent: Oct. 16, 2012

(54) INFORMATION PROCESSING SYSTEM, METHOD AND PROGRAM FOR CLASSIFYING NETWORK NODES

(75) Inventors: Raymond Harry Putra Rudy, Yamato (JP); Akiko Suzuki, Yamato (JP); Hiroki Yanagisawa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 12/472,603

(22) Filed: May 27, 2009

(65) Prior Publication Data
US 2009/0300150 A1    Dec. 3, 2009

(30) Foreign Application Priority Data
May 27, 2008   (JP) ................................ 2008-138373

(51) Int. Cl.
*G06F 15/16* (2006.01)
(52) U.S. Cl. ........ 709/222; 709/200; 709/206; 707/752; 707/754
(58) Field of Classification Search .................. 709/200, 709/203, 206, 222, 223; 707/752, 754, 740
See application file for complete search history.

(56) References Cited

U.S. PATENT DOCUMENTS

| | | | |
|---|---|---|---|
| 6,727,914 B1* | 4/2004 | Gutta | 715/719 |
| 7,665,131 B2* | 2/2010 | Goodman et al. | 726/13 |
| 7,930,353 B2* | 4/2011 | Chickering et al. | 709/206 |
| 8,095,652 B2* | 1/2012 | Rudy et al. | 709/224 |
| 2003/0131063 A1* | 7/2003 | Breck | 709/206 |
| 2008/0155036 A1* | 6/2008 | Pirzada et al. | 709/206 |

FOREIGN PATENT DOCUMENTS

| | | |
|---|---|---|
| JP | 2003-115925 | 4/2003 |
| JP | 2003-348162 | 12/2003 |
| JP | 2004-118541 | 4/2004 |
| JP | 2004-362559 | 12/2004 |
| JP | 2006-178998 | 7/2006 |

* cited by examiner

*Primary Examiner* — Moustafa M Meky
*Assistant Examiner* — El Hadji Sall
(74) *Attorney, Agent, or Firm* — Cantor Colburn LLP; Gail Zarick

(57) ABSTRACT

An information processor and method for classifying user attributes of a plurality of nodes connected to a network. The information processor includes: an action history obtaining unit for generating a spammer-reporting action history set; a related node obtaining unit for generating a node set and a link set related to the spammer-reporting actions; an undirected graph generation unit for generating an undirected graph from the node set and the link set; and a max-cut computation unit classifying the nodes constituting the undirected graph into two exclusive sets that do not commonly include any element so as to maximize an indicator value defined by links bridging the two sets.

19 Claims, 18 Drawing Sheets

300

| ACTION IDENTIFIER | WEIGHT VALUE OF ACTION | DETAIL OF ACTION |
|---|---|---|
| 10 | 1.0 | REPORT AS SPAMMER |
| 21 | 1.0 | DELETE MAIL |
| 33 | 1.0 | DELETE MESSAGE OR COMMENT |
| 45 | 1.0 | REDUCE EVALUATION SCORE |
| 59 | 0.8 | IGNORE INCOMING CALL |
| 61 | 0.5 | POST COMPLIANT COMMENT |
| ... | ... | ... |

FIG. 3

| TIME STAMP | ACTION IDENTIFIER | ACTION | REPORTER IDENTIFIER | TARGET IDENTIFIER |
|---|---|---|---|---|
| 2008/M1/D1/T1 | 1 | MAIL SEND | B | A, C, E |
| 2008/M2/D2/T2 | 10 | SPAMMER REPORT | A | B |
| 2008/M3/D3/T3 | 21 | MAIL DELETION | C | 2001 |
| 2008/M4/D4/T4 | 17 | CONTENT UPLOAD | A | 1036 |
| 2008/M4/D4/T4 | 45 | EVALUATION SCORE REDUCTION | B | E |
| 2008/M5/D5/T5 | 1 | MAIL SEND | A | F |
| 2008/M6/D6/T6 | 10 | SPAMMER REPORT | B | A |
| 2008/M7/D7/T7 | 10 | SPAMMER REPORT | B | C |
| 2008/M8/D8/T8 | 45 | EVALUATION SCORE REDUCTION | E | B |
| 2008/M9/D9/T9 | 8 | MAIL SEND | B | F |
| 2008/M10/D10T10 | 33 | MESSAGE DELETION | C | 3006 |
| 2008/M11/D11/T11 | 33 | MESSAGE DELETION | E | 3006 |
| 2008/M12/D12/T12 | 45 | EVALUATION SCORE REDUCTION | D | C |
| 2008/M13/D13/T13 | 18 | CONTENT DOWNLOAD | F | 1035 |
| 2008/M14/D14/T14 | 45 | EVALUATION SCORE REDUCTION | D | E |
| ... | ... | ... | ... | ... |

EXTRACT RECORDS WITH ACTION IDENTIFIERS CORRESPOND TO SPAMMER-REPORTING ACTIONS

| TIME STAMP | ACTION IDENTIFIER | ACTION | REPORTER IDENTIFIER | TARGET IDENTIFIER |
|---|---|---|---|---|
| 2008/M2/D2/T2 | 10 | SPAMMER REPORT | A | B |
| 2008/M3/D3/T3 | 21 | MAIL DELETION | C | 2001 |
| 2008/M4/D4/T4 | 45 | EVALUATION SCORE REDUCTION | B | E |
| 2008/M6/D6/T6 | 10 | SPAMMER REPORT | B | A |
| 2008/M7/D7/T7 | 10 | SPAMMER REPORT | B | C |
| 2008/M8/D8/T8 | 45 | EVALUATION SCORE REDUCTION | E | B |
| 2008/M10/D10/T10 | 33 | MESSAGE DELETION | C | 3006 |
| 2008/M11/D11/T11 | 33 | MESSAGE DELETION | E | 3006 |
| 2008/M12/D12/T12 | 45 | EVALUATION SCORE REDUCTION | D | C |
| 2008/M14/D14/T14 | 45 | EVALUATION SCORE REDUCTION | D | E |
| ... | ... | ... | ... | ... |

FIG. 4

SPAMMER CRITERION FORMULA
BY INTEGER PROGRAMMING SOLVER

OBJECTIVE FUNCTION: $\quad \frac{1}{4}\sum_{i,j=1}^{n}(1-x_i x_j)w_{ij}$

CONSTRAINT: $\quad \sum_{i=1}^{n} x_i \geq n - 2n^{-}$ $x_i^2 = 1 \text{ for } i=1,...,n$ n: NUMBER OF NODES OF UNDIRECTED GRAPH G(V, E)
n⁻: ESTIMATED NUMBER OF SPAMMERS
$w_{ij}$: WEIGHT FOR BRANCH CONNECTING NODES i AND j (0, IF NO BRANCH)
$x_j$: DECISION PARAMETER OF NODE i; NODE i IS SPAMMER IF $x_i$ = -1, NOT SPAMMER IF xj=+1

FIG. 12

SPAMMER CRITERION FORMULA
BY SEMIDEFINITE PROGRAMMING SOLVER

OBJECTIVE FUNCTION: $\quad \frac{1}{4}\sum_{i,j=1}^{n}(1-x_{ij})w_{ij}$

CONSTRAINT: $\quad \text{Trace}(EX) \geq (n-2n^{-})^2$ $X_{ij} = 1 \text{ for } i=1,...,n$
$X \geq 0$ n: NUMBER OF NODES OF UNDIRECTED GRAPH G(V, E)
n⁻: ESTIMATED NUMBER OF SPAMMERS
$w_{ij}$: WEIGHT FOR BRANCH CONNECTING NODES i AND j (0, IF NO BRANCH)
X: n×n REAL MATRIX
$X_{ij}$: ELEMENT OF i-TH ROW AND j-TH COLUMN IN MATRIX X
E: n×n MATRIS WHOSE ELEMENTS ARE ALL 1

FIG. 13

| | DETERMINATION METHOD | TOTAL NUMBER OF NODES | DISTRIBUTION OF NUMBER OF MESSAGES OF NORMAL NODES | DISTRIBUTION OF NUMBER OF MESSAGES OF SPAMMER NODES | NORMAL CONTENT DELETION PROBABILITY $p_n$ | SPAM CONTENT DELETION PROBABILITY $p_s$ | EXISTENCE RATIO OF SPAMMER NODES (%) | RETALIATORY ACTION PROBABILITY |
|---|---|---|---|---|---|---|---|---|
| EXAMPLE 1 | SDwMC | 500 | N(50, 30) | EXP(100) | 0.1 | 0.9 | 1-15% | 1.0 |
| EXAMPLE 2 | SDwMC | 500 | N(50, 10) | EXP(100) | 0.1 | 0.9 | 1-15% | 0 |
| EXAMPLE 3 | SDwMC | 500 | N(50, 30) | EXP(100) | 0.1 | 0.9 | 1-15% | 0.5 |
| COMPARATIVE EXAMPLE 1 | Point | 500 | N(50, 10) | EXP(100) | 0.1 | 0.9 | 1-15% | 1.0 |
| COMPARATIVE EXAMPLE 2 | Point | 500 | N(50, 10) | EXP(100) | 0.1 | 0.9 | 1-15% | 0 |
| COMPARATIVE EXAMPLE 3 | Point | 500 | N(50, 30) | EXP(100) | 0.1 | 0.9 | 1-15% | 0.5 |

RETALIATION PROBABILITY=1.0

| RATIO OF SPAMMER NODES (%) | PERFORMANCE (RECALL) OF Point METHOD (%) | PERFORMANCE (RECALL) OF SDwMC METHOD (%) |
|---|---|---|
| 1% | 84.00 | 88.00 |
| 2% | 88.00 | 96.00 |
| 3% | 90.67 | 94.67 |
| 4% | 83.00 | 91.00 |
| 5% | 88.80 | 96.00 |
| 6% | 86.00 | 92.67 |
| 7% | 80.57 | 96.00 |
| 8% | 81.50 | 98.00 |
| 9% | 79.11 | 96.00 |
| 10% | 80.00 | 98.40 |
| 11% | 79.64 | 97.45 |
| 12% | 79.67 | 97.33 |
| 13% | 74.15 | 100.00 |
| 14% | 76.57 | 100.00 |
| 15% | 75.20 | 99.73 |

NO RETALIATION

| RATIO OF SPAMMER NODES (%) | PERFORMANCE (RECALL) OF Point METHOD (%) | PERFORMANCE (RECALL) OF SDwMC METHOD (%) |
|---|---|---|
| 1% | 76.00 | 68.00 |
| 2% | 92.00 | 88.00 |
| 3% | 89.33 | 86.67 |
| 4% | 94.00 | 93.00 |
| 5% | 92.80 | 91.20 |
| 6% | 87.33 | 85.33 |
| 7% | 91.43 | 91.43 |
| 8% | 94.00 | 92.50 |
| 9% | 91.56 | 93.78 |
| 10% | 91.20 | 94.00 |
| 11% | 93.45 | 96.36 |
| 12% | 87.33 | 91.33 |
| 13% | 91.08 | 96.00 |
| 14% | 88.57 | 95.71 |
| 15% | 90.67 | 96.27 |

RETALIATION PROBABILITY=0.5

| RATIO OF SPAMMER NODES (%) | PERFORMANCE (RECALL) OF Point METHOD (%) | PERFORMANCE (RECALL) OF SDwMC METHOD (%) |
|---|---|---|
| 1% | 88.00 | 88.00 |
| 2% | 94.00 | 94.00 |
| 3% | 86.67 | 97.33 |
| 4% | 86.00 | 90.00 |
| 5% | 92.80 | 96.00 |
| 6% | 85.33 | 93.33 |
| 7% | 88.57 | 94.29 |
| 8% | 87.50 | 94.00 |
| 9% | 86.22 | 94.67 |
| 10% | 84.40 | 95.60 |
| 11% | 86.91 | 98.18 |
| 12% | 84.00 | 98.00 |
| 13% | 82.77 | 97.85 |
| 14% | 85.43 | 99.71 |
| 15% | 84.27 | 99.20 |

FIG. 20

INFORMATION PROCESSING SYSTEM, METHOD AND PROGRAM FOR CLASSIFYING NETWORK NODES

This application claims priority under 35 U.S.C. §119 from Japanese Patent Application No. 2008-74686 filed May 27, 2008, the entire contents of which are incorporated herein by reference.

BACKGROUND OF THE INVENTION

1. Field of the Invention

The present invention relates to a network analysis technique, and more specifically to an information processing system, an information processing method and a program for classifying the users, in accordance with attributes of users who access a network to send information thereto.

2. Description of Related Art

Recently, information communication over a network such as the Internet or a wide area network (WAN) has become popular with increase in processing capabilities of computers, connecting devices and the like. The information communication over a network typically includes: computers (hereinafter referred to as "nodes") connected to the network to function as Web clients; and a Web server device (hereinafter referred to as "server") accepting and processing access requests from multiple nodes. The server uses a server application written in common gateway interface (CGI), servlet or the like to provide a service such as a mail send-and-receive service, a file send-and-receive service, a search service, or a blog posting based on a social network service (SNS) or chat service.

As more kinds of information are sent and received and more kinds of services are provided over a network, network users who access the network have ranged over broad types. For example, there are users who access a server to send non-malicious mail messages, users who only search and download information managed by a server, and users who send information by posting a blog entry and posting bona fide messages on blogs managed by other users. Hereinafter, user nodes managed by the above bona fide users will be referred to as "normal nodes."

There are also users sending enormous unnecessary information without permission, and users posting malicious messages on chats or blogs. Hereinafter, user nodes managed by such users accessing a network out of malice will be referred to as "spammer nodes."

In some serious cases, the above activities taken by spammer nodes might critically interfere with network activities by, for example, bringing down services provided by bona fide normal nodes other than spammer nodes, or forcing blogs to shut down.

In addition, although sending piles of undesired e-mails over a network will not bring down any services or force any blogs to shut down to critically damage network activities, it will waste network bandwidth, adversely affect network activities of normal nodes, and lead to the spread of computer viruses. With these circumstances, there is a demand for detecting and dealing with such spammer nodes on a network to prevent the spammer nodes from adversely affecting network activities of normal nodes. Furthermore, spammer groups of multiple spammer nodes may work together to camouflage themselves as non-spammer nodes.

Various attempts have already been made to detect spammer nodes. For example, as a method for addressing spam mail messages, a method of creating an answer set of allowable mail messages to determine spam mail messages or the like and causing a device to learn the answer set by machine learning is already known. In addition, a method is also known in which spam levels of certain nodes are determined on the basis of spam reports from multiple nodes, and in which an administrator checks the spam levels to execute access controls on some nodes.

Examples of spam prevention techniques to which the above policies are applied are Japanese Patent Application Publication No. 2003-115925, Japanese Patent Application Publication No. 2004-118541, Japanese Patent Application Publication No. 2004-362559, Japanese Patent Application Publication No. 2006-178998 and Japanese Patent Application Publication No. 2003-348162. In Japanese Patent Application Publication No. 2003-115925 and Japanese Patent Application Publication No. 2004-118541, the number of spam mail transmissions is detected, and users having frequently transmitted spam mail messages are determined as spammer nodes. In Japanese Patent Application Publication No. 2004-362559 and Japanese Patent Application Publication No. 2006-178998, details of messages are analyzed so that features characterizing spammer nodes can be obtained, and an answer set is generated from the features. Then, sources of messages with these features are determined as spammer nodes.

Japanese Patent Application Publication No. 2003-348162 discloses a technique whereby, if a user terminal receives an unwanted e-mail, the user informs a network of information on the e-mail as unwanted e-mail information. In response, the unwanted e-mail is stored among the received e-mails received by a mail receiving server, and the unwanted e-mail information from the user terminal is registered into a database. Then, if the received e-mails include any e-mail identical or closely similar to e-mails indicated by the unwanted mail information registered in the database, the mail receiving server is programmed not to deliver the e-mail.

As described above, the conventional techniques each are either a technique of previously preparing an answer set for allowing contents forwarded over a network to distinguish between spammer nodes and normal nodes, or a technique of generating an answer set by receiving reports from nodes. The techniques based on such answer set generation are effectively applicable to the case where spammer nodes send data with content, such as mail messages. However, application of the above techniques to this case has problems that such learning method might not improve spammer nodes extraction efficiency of a server so much considering the amount of overhead of the server caused by the learning procedure.

Moreover, consider the case where spammer nodes send data with no content or less-than-required amount of content, that is, for example, the case where spammer nodes take actions with unpredictable details, such as posting comments. In this case, it is difficult to obtain features characterizing spammer nodes in advance, and, as a result, it may not be possible to efficiently learn which nodes are spammer nodes interfering with blog posting or chatting.

In addition, techniques based on reports from nodes are also known to have problems. For example, it is known that a spammer node takes a so-called retaliatory action when the spammer node detects that a normal user reports, as a spam mail, a mail send by the spammer node. Specifically, as a retaliatory action, the spammer node reports, to a security center, the reporter (normal node) having reported the spammer node, as a spammer. Such retaliatory actions not only make it more difficult to uniquely determine spammer nodes, but also cause normal nodes to avoid spammer reporting in many cases. Moreover, when spammer nodes form a spammer group, the spammer nodes become able to take adverse actions (such as increasing their evaluations) in addition to retaliatory reporting. Thus, such a technique also has a problem of allowing members of a spammer group to work together to decrease their spam levels. Therefore, there has been a demand for a technique of distinguishing spammer nodes from the other non-spammer nodes among multiple nodes connected to a network without preparing any answer set in advance. In addition, there has also been a demand for a general technique for classifying each of user attributes of nodes accessing an application server as either a normal node or a spammer node by using an access log to the application server, regardless of direct reports from nodes.

SUMMARY OF THE INVENTION

One aspect of the present invention provides an information processor for classifying user attributes of a plurality of nodes connected to a network. The information processor includes: an action history obtaining unit for extracting access log records designated as spammer-reporting actions from an access log and generating therefrom a spammer-reporting action history set; a related node obtaining unit for generating a node set and a link set from the spammer-reporting action history set; a graph generation unit for generating a graph from the node set and the link set; and a max-cut computation unit for classifying the nodes constituting the graph into two sets so as to maximize an indicator value defined by the sum of the link weight values assigned to edges bridging the two sets.

Another aspect of the invention provides a computer-implemented method which includes the steps of: generating a spammer-reporting action history set by extracting, from an access log memory, access log records designated as spammer-reporting actions; generating a node set and a link set from the spammer-reporting action history set; and generating a graph from the node set and the link set by registering a set of links connecting each pair of nodes as an edge in association with its link weight value obtained by summing the action weight values assigned to the set of links connecting the pair of nodes; thus enabling classification of the nodes constituting the graph into two exclusive sets that do not commonly include any elements so as to maximize an indicator value defined by the sum of the link weight values assigned to ones, bridging the two sets, of the links.

Another aspect of the invention includes an article of manufacture tangibly embodying information processesor readable instructions which, when executed, cause an information processor to perform the above process.

BRIEF DESCRIPTION OF THE DRAWINGS

For a more complete understanding of the present invention and advantages thereof, reference is now made to the following description taken in conjunction with the accompanying drawings.

FIG. 3 shows an example of spammer analysis data stored in a spammer analysis data storage.

FIG. 4 shows an example of a data structure of a spammer-reporting action history set generated from access log by an action history obtaining unit.

FIG. 12 shows an example of a spammer criterion formula implemented on an integer programming solver used in the process shown in FIG. 11.

FIG. 13 shows an example of a spammer criterion formula implemented on a semidefinite programming solver.

FIG. 17 shows detailed conditions of a data implementation employed in Examples and Comparative Examples.

FIG. 18 shows the results of Example 1 and Comparative Example 1.

FIG. 19 shows the results of Example 2 and Comparative Example 2.

FIG. 20 shows the results of Example 3 and Comparative Example 3.

DETAILED DESCRIPTION OF THE PREFERRED EMBODIMENTS

Figure 1:
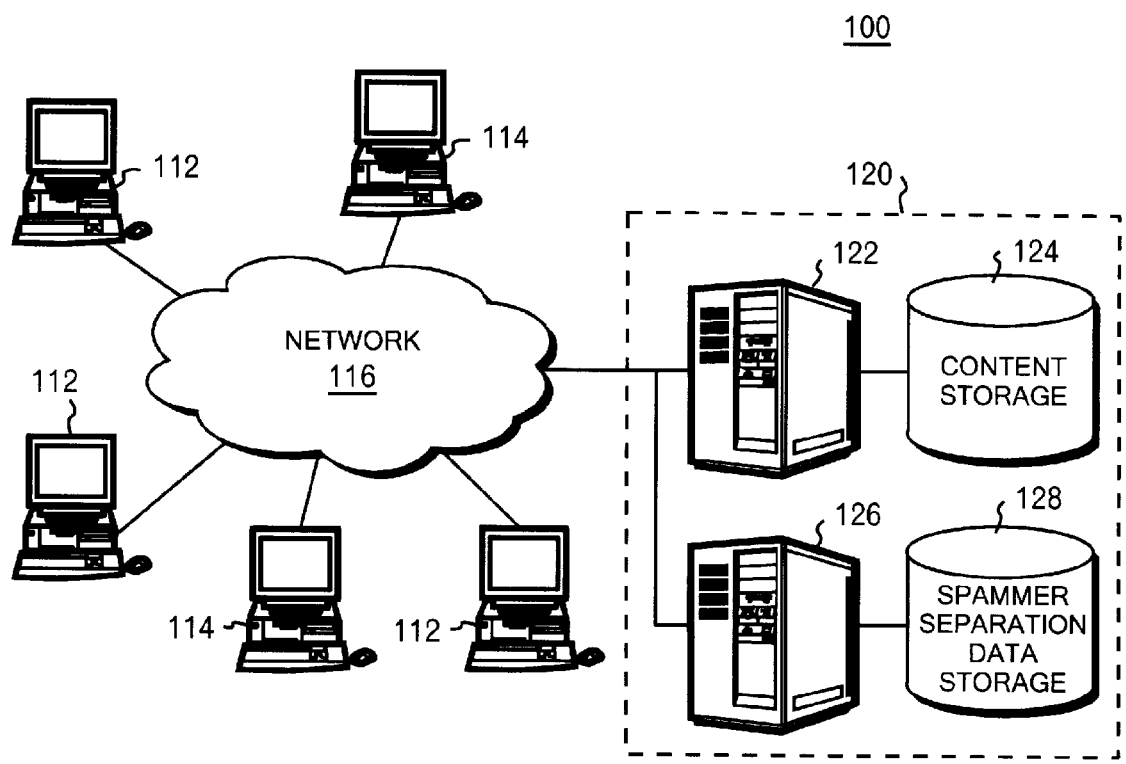
FIG. 1 shows an example of the information processing system.

The present invention has been made in view of the aforementioned problems of the conventional techniques, and provides a new technique for classifying nodes as either a normal node or a spammer node on the basis of access log of nodes connected to a network to access an application server. Here, the normal node accesses the network on a bona fide basis while the spammer node accesses the network out of malice.

In the present invention, the expression "access a network on a bona fide basis" means to take actions through transactions over the network, such as searching, collecting information, communicating, sending mail messages, chatting, posting blog entries, posting comments and taking legal e-commerce activities. Hereinafter, nodes to take such actions will be referred to as normal nodes.

On the other hand, the expression "access a network out of malice" means to access the network so as to damage network activities of normal nodes over the network. Hereinafter, nodes to take such actions will be referred to as spammer nodes. Malicious actions taken by spammer node are, for example, the following nuisances made over a network:

(1) send a message for such a purpose as advertisement or post a comment unrelated to the original document;
(2) post a content only for unrelated advertisement;
(3) unilaterally cancel an auction after the bid is accepted;

(4) do not send goods even though the bidder pays for the goods after the bid is accepted in an auction;

(5) post a comment slandering another individual or organization;

(6) repeat illegal activities such as posting infringing content; and (7) send to other users an offensive content.

In an embodiment of the present invention, access log records defined as spammer-reporting actions are extracted from accesses to an application server over a network, and a spammer-reporting action history set is generated from the extracted records. The spammer-reporting action history set is used by the related node obtaining unit to generate a node set V and a link set E.

The node set V and the link set E are referred to by the undirected graph generation unit and used for generating an undirected graph G(V, E) including, as nodes, nodes related to spammer-reporting actions and registering therein, as edges, connection relationships between nodes.

The undirected graph G(V, E) provides a graph representation in which the nodes related to spammer-reporting actions are connected with links for which action weight values ws assigned to spammer-reporting actions are defined. The information processor according to the present invention classifies user attributes of the nodes of the undirected graph G(V, E) by partitioning the nodes into two sets, that is a normal node set N and a spammer node set S. Here, the normal node set N includes normal nodes as constituent elements while spammer node set S includes spammer nodes as constituent elements. All the nodes are classified into the normal node set N and the spammer node set S, and the border of these two sets is set so as to maximize an indicator value representing spam characteristics of links connecting the normal node set N and the spammer node set S, under the constraint to be described later.

Among link weight value $w_{ij}$ assigned to the links, the sum of link weight values $w_{ij}$ assigned to the links connecting the normal node set N and the spammer node set S is calculated as the indicator value representing spam characteristics by using either an integer programming, a semidefinite programming or a greedy method. Then, the border of these two sets is determined so as to maximize the indicator value under the constraint to be described later. In addition, the solver referred to as a "greedy solver" can determine the border of these two sets as to maximize the difference between: the sum of link weight values $w_{ij}$ assigned to the links connecting the normal node set N and the spammer node set S; and the sum of link weight values $w_{ij}$ locally existing within the two respective sets. This maximization is an equivalent expression to the previously mentioned maximization. In other words, the greedy solver can determine the border of the two sets so as to make the sets close to the max-cut sets.

Preferably, a max-cut solver is invoked to obtain max-cut sets. One or more max-cut solvers, or, a combination or all of an integer programming solver, a semidefinite programming solver, or the greedy solver may be selected to be implemented as appropriate. When multiple solvers are selected from (i) the integer programming solver, (ii) the semidefinite programming solver and (iii) the greedy solver, one of the max-cut solvers is selectively invoked in accordance with the total number of processing-target nodes related to spammer-reporting actions, and thereby efficient processing according to the total number of processing-target nodes and the required accuracy of spammer determination is achieved.

The present invention also provides an information processing system that further includes an analysis server implemented with the above max-cut solvers, and information processing method and program for allowing the above classification of user attributes.

Hereinafter, the present invention will be described by means of an embodiment. Note, however, that the present invention is not limited to the embodiment described below.

Referring to FIG. 1, an example is shown of an information processing system 100. The information processing system 100 includes a network 116, multiple nodes 112 and multiple nodes 114. The nodes 112 and 114 are connected to the network 116 to access a server 120 through the network 116.

Among the multiple nodes 112 and 114, the nodes 112 are normal nodes, which access the network on a bona fide basis and which will do no spamming activity, while the nodes 114 are spammer nodes, which do spamming activities that may have serious adverse effects on network activities of normal users on the network. In this embodiment, a spammer node is defined, for example, as any one of the following nodes: a node sending out contents offensive to many of the other nodes; a node seriously violating laws by uploading infringing images or other contents; a node uploading contents slandering certain individuals, organizations or the like; a node sending other nodes contents including certain goods, services, viruses or the like without consent of these other nodes; and a node cheating normal nodes or store owners in virtual shopping malls.

In this embodiment, each of user attributes of unspecified nodes accessing an application server is classified as either a spammer node or a normal node by using the access history. Note that each node can be uniquely identified by use of any network identifier that allows for unique identification of a node or a user, such as a user ID, an IP address or the like.

Various references can be used to determine a certain node is a spammer node. For example, when a content posted by a node is deleted at a request of another node, the former node can be regarded as a node with high spam level. Note, however, that there are known to be spammer groups of multiple spammer nodes working together to increase the evaluation scores of their uploaded contents in order to lower their spam levels.

In addition, even a spammer node can report that another node is a spammer even though the latter node is actually a non-spammer. Moreover, in some cases, such spam levels might be insufficient to make appropriate decisions, and this trend is expected to be clearer with increase in existence ratio of spammer nodes.

Thus, determining spammer nodes by using only the spam levels is not appropriate in some cases, since this is likely to cause normal nodes to be accidentally determined as spammers. In other cases, retaliatory actions of spammer groups will virtually negate the effect of the spammer detection based only on the spam levels. The information processing system 100 of this embodiment makes it possible to appropriately separate spammer nodes out even if activities of a spammer group interrupt the spam level analysis.

In the example shown in FIG. 1, the server 120 connected to the network 116 includes an application server 122 for providing Web services and an analysis server 126 for separating spammers out so that functions of the server 120 can be clearly described. Specifically, the application server 122 receives requests such as search requests, upload requests and download requests from nodes connected to network 116, and provides the nodes with services corresponding to their requests. The services provided by the application server 122 are not particularly limited, and may be search services, blog provider services, SNS, mail delivery service and chat service, for example.

To respond to requests from nodes, the application server 122 manages the content storage 124. The term "content" means a data structure created in a computer-accessible format, such as text, image, video data, audio data, multimedia data and a mail. When receiving a request from a node, the application server 122 accesses the content storage 124 to search a content, upload or download a content, or forward a mail.

The analysis server 126 monitors an access log to the application server 122 of respective nodes accessing the application server 122. The access log can be registered as a log of the application server 122 or the like. The analysis server 126 periodically polls the application server 122, and obtains, as target data for analysis, access log data accumulated after the last polling. Alternatively, in another example, the analysis server 126 may independently monitor accesses of nodes to the application server 122 to accumulate access log records related to spammer-reporting actions and use these records in the subsequent processes.

The analysis server 126 manages the spammer analysis data storage 128. In the spammer analysis data storage 128, registered is various data for separating spammers out from non-spammer nodes, such as definition of spammer-reporting actions, weights assigned to spammer-reporting actions on the basis of statistics. Accordingly, the spammer analysis data storage 128 enables the analysis server 126 to separate out spammers. The spammer analysis data will be described in detail later.

The analysis server 126 generates a result of spammer detection as list of node identifiers to generate an output result. The administrator of the server 120 refers to the output result of the analysis server 126 to classify each of user attributes of nodes having access histories as either a spammer node or a normal node, which is a non-spammer node. Thereafter, the administrator can configure the server 120 to filter against nodes specified as spammer nodes. In addition, the analysis server 126 may inform the application server 122 of the generated list to allow the application server 122 to use the list to perform filtering, such as inhibiting an access from an IP address.

The analysis server 126 can be implemented separately from the application server 122 as in the example shown in FIG. 1, but can alternatively be implemented as a management module of the application server 122.

Server 120 can be configured as an information processor with either a microprocessor based on the CISC architecture, such as PENTIUM (registered trademark) or a PENTIUM (registered trademark) compatible chip, or a microprocessor based on the RISC architecture, such as POWER PC (registered trademark). Alternatively, the server 120 can even be configured as a cluster of such information processors. The server 120 with any of these configuration is controlled by an operating system suitable for the configuration, such as WINDOWS (registered trademark) SERVER200X, UNIX (registered trademark) or LINUX (registered trademark). In addition, the server 120 executes a server program such as CGI, servlet or APACHE to process requests from the nodes 112 and 114. Here, such a server program is implemented in a programming language such as C++, JAVA (registered trademark), JAVA (registered trademark) BEANS, PERL, RUBY or PYTHON.

To obtain access log records to perform spammer detection, the application server 122 and the analysis server 126 each includes a relational database such as DB2 (registered trademark), and are capable of searching and retrieving data using structured query language (SQL) sentences enabling reference to the relational database. In this embodiment, each of the application server 122 and the analysis server 126 can be implemented by using a database application and a search application written in any of various programming languages instead of using reference processes with a relational database and SQL.

Between the server 120 and the nodes 112 and 114, a transaction using a file transfer protocol such as an HTTP protocol is established based on a transaction protocol such as TCP/IP. Based on this transaction, the nodes 112 and 114 take various actions on the server 120, such as uploading and downloading files, posting a blog entry, reading a blog, posting a comment, e-commercing, chatting, sending and downloading forms, uploading and downloading contents, requesting to delete a content, and reporting a spammer. In addition, the server 120 can function as a mail server using a simple mail transfer protocol (SMTP), and enables the nodes 112 to exchange mail messages with each other or with the nodes 114.

Each of the nodes 112 and 114 is implemented as a personal computer, a work station or a server. When any of the nodes 112 and 114 is configured as a personal computer or a work station, its microprocessor (MPU) may include any known single-core or multicore processor.

In addition, the node may be controlled by any operating system, such as WINDOWS (registered trademark), UNIX (registered trademark), LINUX (registered trademark) or MAC OS.

On the other hand, when the server 120 is implemented as a Web server, any of the nodes 112 and 114 is equipped with browser software such as Internet Explorer (trademark), Mozilla, Opera or Netscape Navigator (trademark), and thereby accesses the server 120.

The spammer nodes 114 might be implemented as servers. In this case, each spammer node 114 can be implemented to include a hardware configuration and an operating system used for the server 120.

Figure 2:
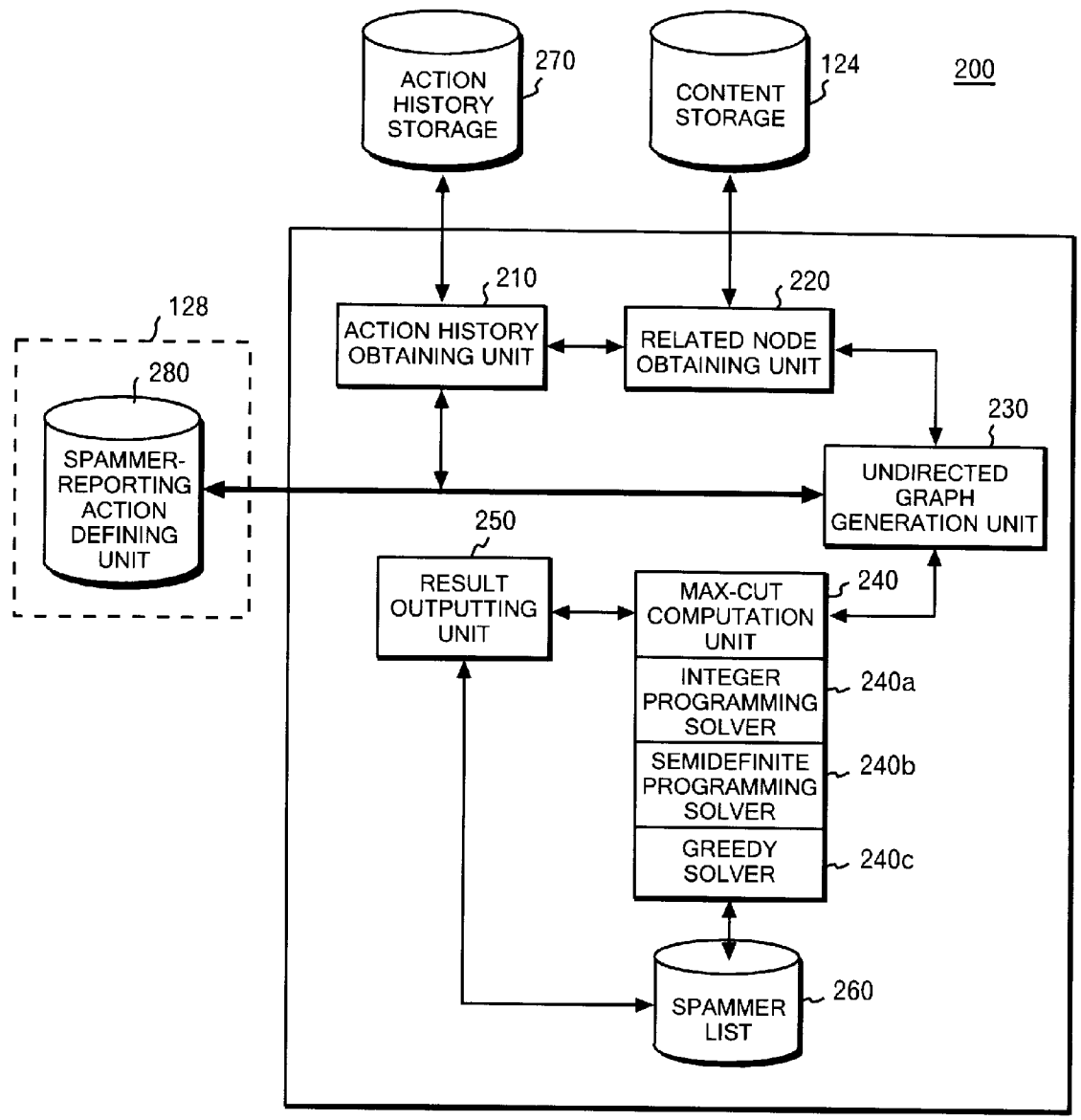
FIG. 2 shows a software module configuration of an analysis server shown in FIG. 1.

FIG. 2 shows a software module configuration 200 of the analysis server 126 shown in FIG. 1. In the analysis server 126, programs and hardware work together to implement multiple functional means which collectively implement functional means for enabling spammer detection.

The analysis server 126 is configured by including an action history obtaining unit 210, a related node obtaining unit 220, an undirected graph generation unit 230, a max-cut computation unit 240 and a result output unit 250. Hereinafter, processes executed by these respective functional units will be described in detail.

[Action History Obtaining Unit 210]

The action history obtaining unit 210 obtains access log data accumulated after the last polling. The action history obtaining unit 210 can either obtain the access log data by accessing to an action history storage 270 in the application server 122, or monitor actions on the application server 122 to obtain access log data within a predetermined period, and to accumulate the log data in an appropriate storage area. Each access log record is implemented to have a configuration including a reporter identifier indicating a requester of an action, a target identifier uniquely indicating a content or a node of target of the request, and an action identifier identifying detail of the action.

The action history obtaining unit 210 obtains an action identifier registered in each access log record, and checks whether or not the action identifier indicates a spammer-reporting action defined by the spammer-reporting action defining unit 280. When determining that the record is related to a spammer-reporting action as a result of this check, the action history obtaining unit 210 extracts the access log record to generate a spammer-reporting action history set exclusively including records related to spammer-reporting actions. Then, the action history obtaining unit 210 registers, as a view, a list or a table, the generated spammer-reporting action history set into an appropriate storage area in the analysis server 126.

[Related Node Obtaining Unit 220]

The related node obtaining unit 220 extracts nodes registered in the spammer-reporting action history set to generate a node set V. The node set V is represented as a data structure of a list in which nodes related to spammer-reporting actions are registered. When any of actions is made for a content, the related node obtaining unit 220 refers to the content storage 124 of the application server 122 to obtain, based on a target identifier, a target-node identifier indicating the creator of the target content. The related node obtaining unit 220 can generate the node set V by registering, without redundancy, reporter identifiers and target-node identifiers of nodes related to spammer-reporting actions. The related node obtaining unit 220 generates the node set V and registers it as a view, a list or a table.

Thereafter the related node obtaining unit 220 generates a link set E. The link set E is described as a list in which a reporter identifier and a target-node identifier related to the spammer-reporting action and a weight value assigned to a spammer-reporting action occurring between these related nodes are registered in an associated list. These generated node set V and link set E are each stored into an appropriate storage area such as RAM in the analysis server 126 as a view, a list or a table.

[Undirected Graph Generation Unit 230]

The undirected graph generation unit 230 refers to records in the node set V and the link set E to generate an undirected graph G(V, E) in which certain nodes are associated with a disfavor level or an annoyance level between one another. The undirected graph G(V, E) has a data structure including, as nodes, the nodes related to the spammer-reporting actions, and each node of the graph G(V, E) can be generated by using a data table in which all links between nodes are listed. The undirected graph G(V, E) can be represented as a table structure in which each link is registered with nodes defining the link and a link weight value $w_{ij}$ calculated for each link.

In this embodiment, a link means an edge linking nodes. Even when multiple spammer-reporting actions between certain two nodes are registered, these actions are registered as a single link. Meanwhile, for a spammer-reporting action occurring between a node i and a node j, a link weight value $w_{ij}$ is defined as the following expression (1) with occurrence times T.

[Formula 1]

$$w_{ij} = \sum_{t=1}^{T} ws_{ij}(t) \quad (1)$$

In the above expression (1), $ws_{ij}(t)$ is an action weight value registered in the spammer analysis data storage 128 for the t-th spammer-reporting action occurring between the node i and the node j.

The undirected graph generation unit 230 extracts links using the above data table. In addition, the undirected graph generation unit 230 calculates a link weight value $w_{ij}$ for each extracted link by using the above expression (1), and associates the extracted link with related nodes and the calculated link weight value to generate the undirected graph G(V, E).

[Max-Cut Computation Unit 240]

By referring to the undirected graph G(V, E), the max-cut computation unit 240 makes determination to classify each of user attributes of nodes in the undirected graph G(V, E) as either a spammer node or a normal node. In this embodiment, a set including spammer nodes as elements is referred as a spammer node set S while a set including normal nodes as elements is referred as a normal node set N, and nodes are partitioned into these two sets. In this embodiment, a max cut is defined as a partition (cut) of nodes of the entire node set into two sets, that is, the spammer node set S and the normal node set N, as to maximize either the number of links each connecting an element in the spammer node set S and another element in the normal node set N, or the sum of the link weight values of these links.

The max-cut computation unit 240 of this embodiment should preferably be implemented by including max-cut solvers 240a, 240b and 240c which respectively perform different processes so that the max-cut computation unit 240 can select one of these solvers in accordance with the total number of processing-target nodes and cause the selected solver to perform the near-optimal max-cut computation. Specifically, the max-cut solver 240a is implemented as an integer programming solver to be applied to the case where the number of processing-target nodes is relatively small, for example, 500 or less. Meanwhile, the max-cut solver 240c is implemented as a greedy solver. Though the greedy solver is somewhat inferior in accuracy, it can be applied to the case where the number of processing-target nodes is large while preserving the computational scalability of max-cut computation, and can also be used when a digest of spammer nodes is desired to be quickly obtained.

The max-cut solver 240b is implemented as a semidefinite programming solver to perform max-cut computation using semidefinite programming. In this embodiment, the max-cut solver 240b is invoked when the total number of nodes exceeds the first threshold preset in the max-cut solver 240a, and performs max-cut computation while maintaining its computational scalability. The max-cut solver 240c is invoked when the total number of nodes exceeds the second threshold preset in the max-cut solver 240b. Though the max-cut solver 240c can perform max-cut computation for all possible combinations of the nodes, it can be preferably applied to the case where a limited number of spammer nodes are desired to be extracted from an enormous number of nodes since the max-cut solver 240c involves low computational complexity per a determination step.

The nodes classified in the spammer node set S by the max-cut computation unit 240 are registered into an appropriate storage area in the server 126 together with unique identifiers of the respective nodes and spam levels calculated for the respective nodes. Here, the above information is registered as a spammer list 260. In this embodiment, a value calculated from the following expression (2) can be used as a spam level.

[Formula 2]

$$W_k = \sum_l w_{kl} \quad (2)$$

In the above expression (2), $W_k$ denotes a spam level of a node k while $W_{kl}$ denotes a link weight value calculated for a link connecting a node k and a node l. Collectively, the links from multiple nodes l used here are those concentrating to the node k. Note that procedures performed by the respective max-cut solvers will be described in detail later.

Though a spam level is calculated from undirected links in the above description, it can be calculated from directed links. For example, a direction from a reporter identifier to a target identifier in the spammer-reporting action history set may be given to a link, and the spam level of the node k may be calculated as link weight values of directed links whose target identifiers indicate the node k. Note, however, that this method is based on confidence in nodes indicated by the related reporter identifiers, and thus might reduce reliability of the obtained spam level when any of the related reporter identifiers is a spammer node.

[Result Output Unit 250]

The result output unit 250 refers to the spammer list 260 registered in the server 126, sorts nodes with high spam level in descending order of spam level, and outputs the sorted nodes together with details of actions and the like as an output result of spammer detection. The output result can be hardcopied as a list or the like so that the administrator can refer to it. In another example, the output result may be sent to the application server, assigned an appropriate URI, and registered into the application server 122 as access analysis data. Moreover, the result output unit 250 may inform the application server 122 of the output result, and thereby allow the application server 122 to use the output result to automatically filter against IP addresses and user identifiers corresponding to the result.

FIG. 3 shows an example of spammer analysis data 300 stored in the spammer analysis data storage 128. The spammer analysis data 300 includes fields 310, 320 and 330. Field 310 includes action identifiers of respective actions to be classified as spammer-reporting actions among action identifiers to be assigned to actions registered in the access log to the server 120. Field 320 includes weight values used when the corresponding action is referred to as a spammer-reporting action. Field 330 includes details of the respective spammer-reporting actions. For example, a spammer-reporting action definition identified by an action identifier of 10 is used for specifying an action of reporting a certain node as a spammer node, and such an action is assigned a weight value ws of 1.0 used when it is determined whether or not the certain node is a spammer node.

Meanwhile, the detail of an action definition identified by an action identifier of 61 is "post a compliant comment," and thus, in order to reliably specify such an action as a spammer-reporting action, the frequency of the action needs to be considered. Accordingly, the weight value ws for such an action registered in the field 320 is set to as small as 0.5. Note that the spammer analysis data 300 shown in FIG. 3 is only an example. The weight values to be assigned to actions may be set as other values, and the field 330 may not be included in the spammer analysis data 300 as an entry item if details of actions need not be included in an analysis or can be obtained from the access log itself.

As shown in FIG. 3, the action weight values on the basis of which link weight values are calculated are given as positive values only. However, they may also be given as negative values. Note, however, that an action detail corresponding to a negative action weight value indicates an action contrary to spammer-reporting actions, that is, actions belong to trust reports. An action of a node that belongs to the trust reports means the one that is triggered by the trust or mutual relationship of the node on another node. This may include actions to increase the evaluation score of another node or replying a message, for example.

FIG. 4 shows an example of a data structure of the spammer-reporting action history set generated from the access log by the action history obtaining unit 210 (shown in FIG. 2). The action history obtaining unit 210 accesses an access history generated by the application server 122, refers to an access history recorded after a time stamp indicating the last time when an access history is obtained, extracts the access history accumulated from the last time to the current time, and thereby obtains table 400. The illustrated example of the table 400 is configured by including fields 410, 420, 430, 440 and 450. Field 410 includes time stamps when actions are taken. Field 420 includes action identifiers indicating details of the actions. Field 430 includes digests of details of the actions. Fields 440 and 450, respectively, include reporter identifiers and target identifiers related to the actions.

The action history obtaining unit 210 accesses the spammer analysis data storage 128 in the analysis server 126 to obtain action identifiers defined for spammer-reporting actions, and searches the table 400. By searching the table 400, the action history obtaining unit 210 retrieves records defined as spammer-reporting actions, registers the retrieved records into a list to generate the list as a spammer-reporting action history set 460. Note that, when processing-target identifiers are content identifiers and if the content identifiers are registered into a target identifier field 450a in the spammer-reporting action history set 460, the related node obtaining unit 220 obtains target-node identifiers uniquely identifying creator nodes of the contents identified by the content identifiers, and registers the target-node identifiers into the node set V. In another embodiment, the action history obtaining unit 210 may obtain target-node identifiers from the content identifiers before giving the content identifiers to the related node obtaining unit 220 to replace, with the target-node identifiers, the content identifiers in the field 450a in the spammer-reporting action history set 460. In this embodiment, the related node obtaining unit 220 obtains reporter identifiers and target-node identifiers from the spammer-reporting action history set 460 to generate a node set V and a link set E.

Thereafter, the related node obtaining unit 220 refers to the spammer-reporting action history set 460 by using SQL sentences to generate the node set V and the link set E.

Figure 5:
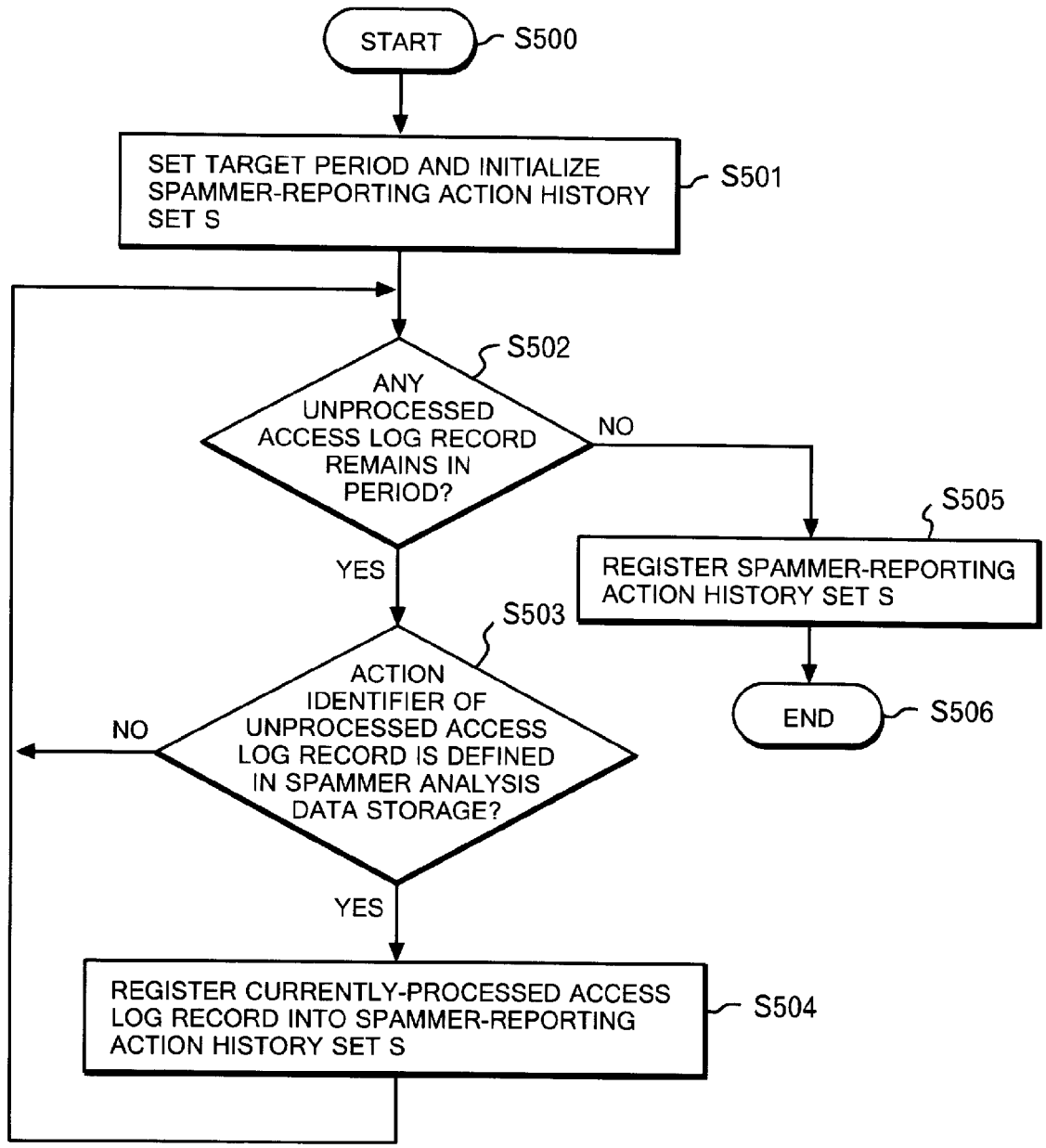
FIG. 5 is a flowchart of a spammer-reporting action history set generation process performed by the action history obtaining unit.

FIG. 5 is a flowchart of a spammer-reporting action history set generation process performed by the action history obtaining unit 210. The process shown in FIG. 5 starts at step S500. In step S501, the action history obtaining unit 210 designates an investigation-target period of the access log to extract access log data accumulated in the investigation-target period, and initializes the spammer-reporting action history set 460 to an empty set. In step S502, the action history obtaining unit 210 determines whether or not any access log record remains unprocessed in the investigation-target period. If no unprocessed access log record remains therein (no), the process branches to step S505, in which the action history obtaining unit 210 determines the spammer-reporting action history set 460 and stores it into an appropriate storage area. The action history obtaining unit 210 terminates the process in step S506, and informs the related node obtaining unit 220 of completion of the spammer-reporting action history set generation process.

If any access log record remains unprocessed in the investigation-target period (yes) in step S502, the action history obtaining unit 210 determines whether or not the action identifier of the current processing-target record is registered as a spammer-reporting action, in step S503. If the action identifier of the processing-target record is not registered as a spammer-reporting action (no), the process branches to step S502, in which the action history obtaining unit 210 determines whether or not another access log record remains unprocessed in the investigation-target period. If the action identifier of the processing-target record is registered as a spammer-reporting action (yes), the action history obtaining unit 210 registers the currently-processed access log record into the spammer-reporting action history set 460, in the step S504.

In this event, if the processing-target identifier is a content identifier or the like, the action history obtaining unit 210 also searches for a target identifier indicating a creator node of the content identified by the processing-target identifier, and registers, as a target-node identifier, this target identifier into the target identifier field 450a. After the registration of this record, the process returns to step S502, in which the action history obtaining unit 210 determines whether or not another access log record remains unprocessed in the investigation-target period. In this way, the action history obtaining unit 210 continues to register a spammer-reporting action into the spammer-reporting action history set 460 until completing the processing of all the access log records within the investigation-target period.

The related node obtaining unit 220 refers to the spammer-reporting action history set 460 generated in the process shown in FIG. 5 to generate a node set V and a link set E. Though data structures of the node set V and the link set E may be each implemented as a table, a list or a vector format, the node set V and the link set E are each described to be implemented with a list structure in this embodiment.

The related node obtaining unit 220 generates the node set V as a list including reporter identifiers in a field 440a and target-node identifiers in the field 450a without redundancy by referring to the spammer-reporting action history set 460 to extract these types of identifiers. Note that any value that can uniquely identify a node can be used as a reporter identifier in the field 440a. For example, a reporter identifier in the field 440a may be a certain user ID, a username, a source mail address, a domain name, an IP address or the like.

If a spammer-reporting action relates to a mail message, the corresponding target-node identifier in the field 450a may be a destination mail address or an IP address. If a spammer-reporting action relates to upload or download of content, the corresponding target-node identifier in the field 450a may be a user ID, a username, a domain name, an IP address or the like of a content creator who registers the content using the URI or URL indicating the content's location, as described above. When determining that a target identifier 450a is associated with a content, the related node obtaining unit 220 accesses the application server 122 and refers to the content storage 124 and the like to obtain a unique identifier of a creator of the content from the content storage 124 with reference to a user database or the like. Then, the related node obtaining unit 220 uses the obtained identifier as a target-node identifier in the field 450a to generate the node set V. An example of a data structure of the node set V will be described in detail later.

After generating the node set V, the related node obtaining unit 220 also initializes the link set E as follows. First, the related node obtaining unit 220 refers to the field 420 used for registration of the action identifiers registered in the spammer-reporting action history set 460 so as to obtain weight values ws assigned to the respective action identifiers, and registers these weight values ws as action weights into records of the link set E. Thereafter, the related node obtaining unit 220 obtains a reporter identifier and a target-node identifier corresponding to each correctly-processed action identifier and enters them respectively into corresponding fields of a record corresponding to the action identifier of the records of the link set E. Thus, the link set E is generated.

Figure 6:
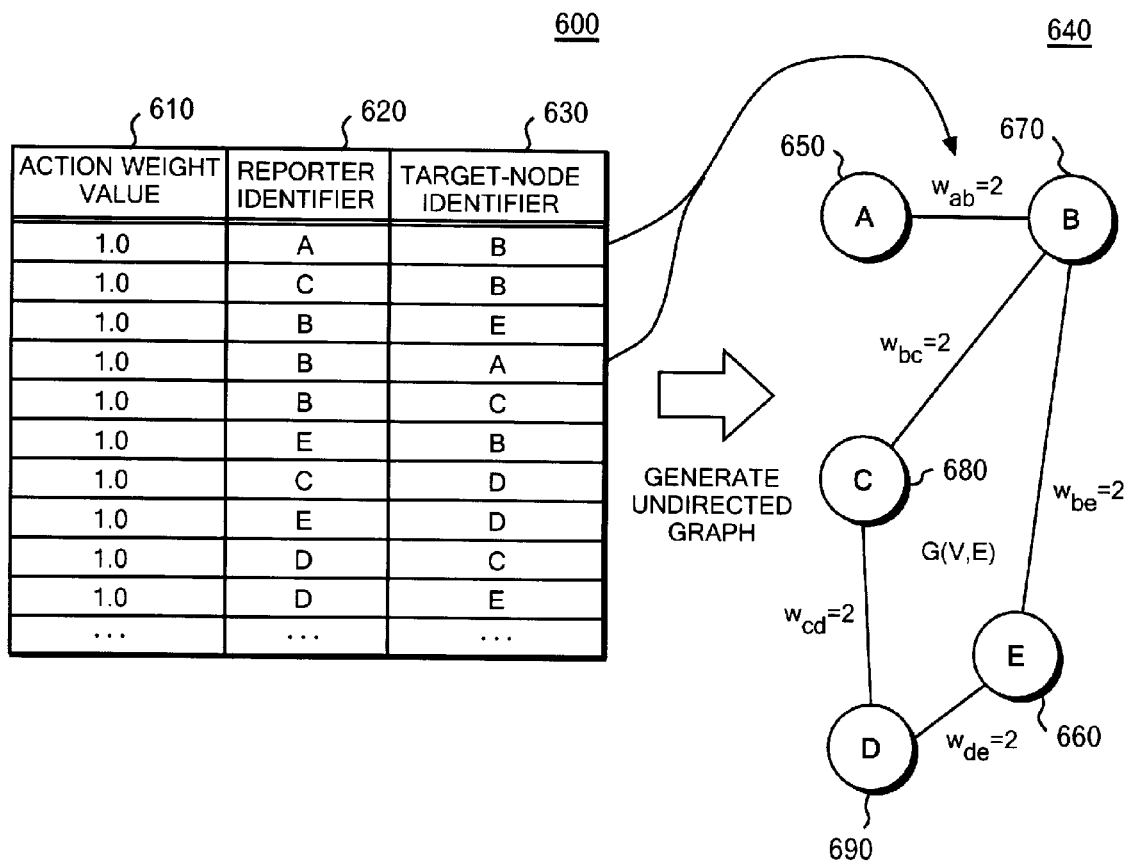
FIG. 6 shows an example of a link set E generated by a related node obtaining unit 220, where the link set E is implemented as a link list.

FIG. 6 shows an example of the link set E generated by the related node obtaining unit 220, where the link set E is implemented as a link list 600. As shown in FIG. 6, the link list 600 includes fields 610, 620 and 630. Field 610 includes action weight values ws respectively assigned to spammer-reporting actions. Reporter identifiers are registered in the field 620 and target-node identifiers are registered in the field 630. In the link list 600 shown in FIG. 6, each of the listed action weight value ws is a maximum value of 1.0 for simplicity. However, an action weight value ws of each action could be selected from the action weight values ws shown in FIG. 3 in accordance with a spam-relevance level of the action as described above, and registered into the field 610.

The undirected graph generation unit 230 generates an undirected graph G(V, E) by using the items in the fields of the link list 600 shown in FIG. 6. In FIG. 6, an exemplary graphical representation of the undirected graph G(V, E) is shown as undirected graph 640. The undirected graph 640 is graphically represented as a graph including, as nodes, the reporter identifiers in the field 620 and the target-node identifiers in the field 630 in the link list 600, and these nodes are connected to one another with links. Here, any two nodes linked together are connected only by a single link. In addition, a link weight value $w_{ij}$ calculated for each link by using the above expression (1) is shown adjacent to the link.

The nodes registered in the link list 600 are registered as nodes 650-690 regardless of whether or not the node is generated from a reporter identifier or a target-node identifier. In addition, the nodes are connected with links, and thereby the link list 600 is represented as an undirected graph.

Figure 7:
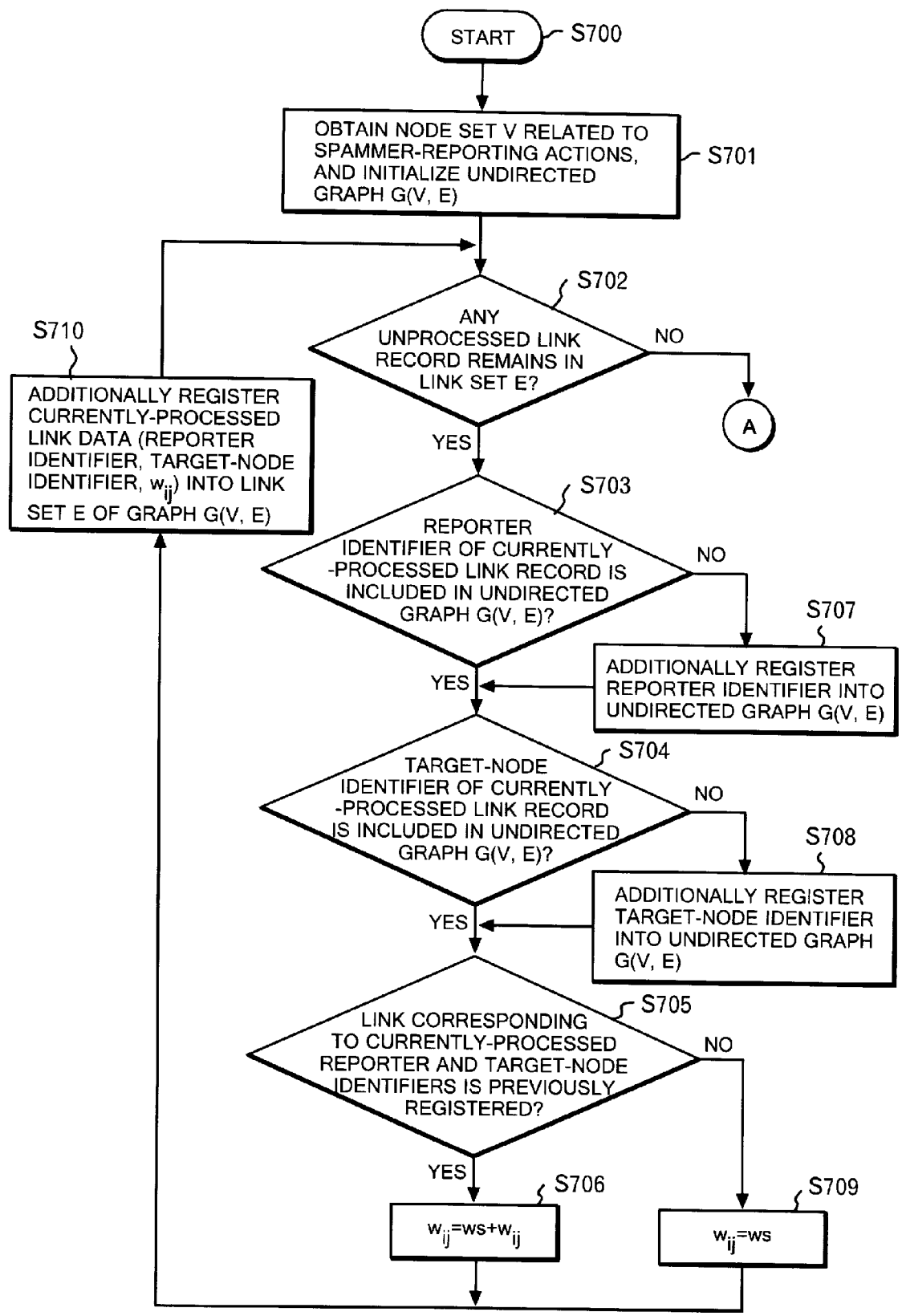
FIG. 7 shows a flowchart of an undirected graph generation process performed by the undirected graph generation unit.

In this way, the undirected graph generation unit 230 generates an undirected graph by using the node set V and the link set E generated by the related node obtaining unit 220. FIG. 7 shows a flowchart of an undirected graph generation process performed by the undirected graph generation unit 230.

The undirected graph generation process shown in FIG. 7 starts at step S700. In step S701, the undirected graph generation unit 230 obtains a node set V in which nodes related to spammer-reporting actions are listed, and initializes the undirected graph G(V, E). In step S702, the undirected graph generation unit 230 determines whether or not any link record connecting nodes registered in the node set V remains unprocessed in a link set E. If no unprocessed link record remains in the link set E (no), the process branches to point A. The process subsequent to point A will be described later.

If any link record remains unprocessed in the link set E (yes) in step S702, the undirected graph generation unit 230 determines whether or not the reporter identifier of the currently processed link record is registered as a node in the undirected graph G(V, E), in step S703. If the reporter identifier is not registered (no), the process branches to step S707, in which the undirected graph generation unit 230 registers, as a node, the currently-processed reporter identifier into the undirected graph G(V, E). Thereafter, the process proceeds to step S704. On the other hand, if the reporter identifier of the currently-processed link record is registered as a node in the undirected graph G(V, E) (yes) in step S703, the process branches to S704. In step S704, the undirected graph generation unit 230 determines whether or not the target-node identifier of the currently-processed link record is registered as a node in the undirected graph G(V, E). If the target-node identifier is not registered (no), the process branches to step S708, in which the undirected graph generation unit 230 registers, as a node, the target-node identifier in the undirected graph G(V, E). Thereafter, the process proceeds to step S705.

If the target-node identifier of the currently-processed link record is registered as a node in the undirected graph G(V, E) (yes) in step S704, the process branches to step S705. In step S705, the undirected graph generation unit 230 determines whether or not a link having, as the end nodes, the currently-processed reporter and target-node identifiers is registered in the undirected graph G(V, E) by checking the link set E. If the link having the end nodes of the same combination of the identifiers is registered (yes), the process branches to step S706. In step S706, the undirected graph generation unit 230 reads out the action weight value ws assigned to the currently-processed link record to update the link weight value $w_{ij}$ having been calculated for the link connecting these end nodes. Specifically, the undirected graph generation unit 230 adds, to this link weight value $w_{ij}$, the action weight value ws of the currently-processed link record, that is, $w_{ij}=ws+w_{ij}$.

If the undirected graph generation unit 230 determines that the link having the end nodes of the same combination of the identifiers is not previously registered (no), the process branches to step S709. In step S709, the link weight value $w_{ij}$ of the link is calculated as $w_{ij}=ws$ by using the action weight value ws of the currently-processed link record.

After the processing of the steps S706 and S709 is completed and thus the link weight value $w_{ij}$ of the link is determined, the link data (a reporter identifier, a target identifier and an action weight value ws) of the currently-processed link record is registered as link data of the undirected graph G in step S710, and the process returns to step S702. The process shown in FIG. 7 is iteratively performed until no unprocessed link record remains in the link set E. When no unprocessed link record remains in the link set E, the process branches to the process shown in FIG. 8 from point A.

Figure 8:
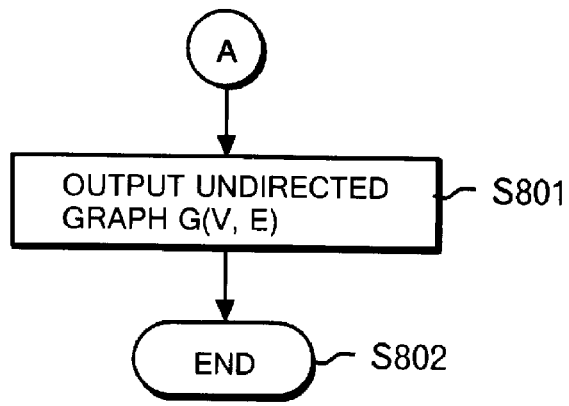
FIG. 8 shows a flowchart of the subsequent undirected graph generation process continued from a point A.

FIG. 8 shows a flowchart of the subsequent undirected graph generation process continued from point A. After the process shown in FIG. 7 branches from point A, the undirected graph generation unit 230 outputs the undirected graph G(V, E) in step S801, and terminates the generation process of the undirected graph G(V, E) in step s802. The undirected graph G(V, E) may be written in any of various formats such as a list, a table and a vector format, and thus may be registered in any format in consideration of processing efficiency.

Figure 9:
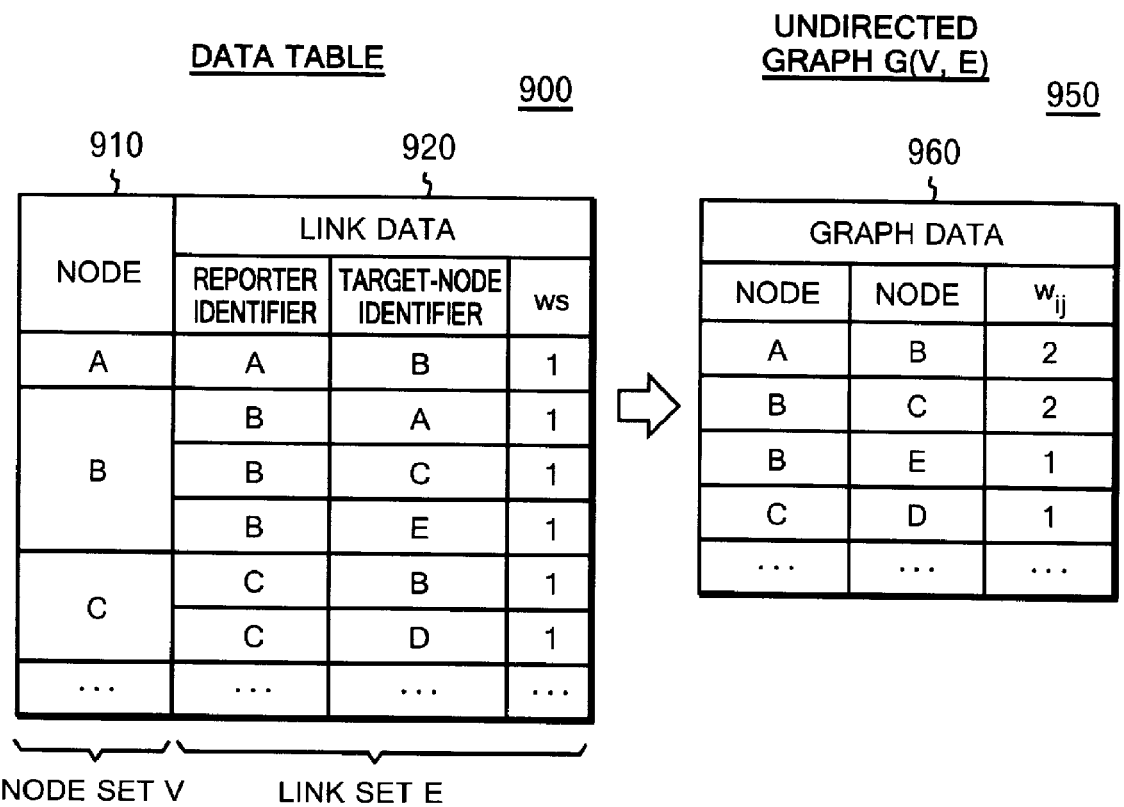
FIG. 9 shows a data table, generated through the undirected graph generation process shown in FIGS. 7 and 8 and used to generate the undirected graph G(V, E), and a data representation of the undirected graph G(V, E), generated from the data table.

FIG. 9 shows a data table 900 and a data representation 950 of the undirected graph G(V, E). The data table 900 is generated through the undirected graph generation process shown in FIGS. 7 and 8 and is used to generate the undirected graph G(V, E), while the data representation 950 is generated from the data table 900.

The data table 900 includes a field 910 in which nodes are registered as nodes of the graph, and items registered in the field 910 correspond to elements of the node set V generated by the related node obtaining unit 210. In addition, the data table 900 also includes a field 920 used for registration of data corresponding to the link set E. In field 920, subfields are allocated. The allocated subfields are respectively used for registration of reporter identifiers, target-node identifiers and action weight values ws registered in the link set E. Note that, the field 920 shown in FIG. 9 is used for processing reporter identifiers and target-node identifiers as nodes of an undirected graph. Field 920 includes link list 600 of the link set E including, as reporter identifiers, the nodes registered in the node set V. Specifically, in the link list 600 registered in the field 920, the records including the same node as a reporter identifier are associated with one another and the records are sorted in order such as ascending order of time stamp.

The undirected graph generation unit 230 performs the process shown in FIGS. 7 and 8, and thus generates the undirected graph G(V, E) 950 represented in a data representation from the data table 900 corresponding to the node set V and the link set E. The undirected graph G(V, E) 950 is configured as a field 960 used for registration of graph data. The graph data is configured by including two kinds of nodes specifying links and link weight values $w_{ij}$.

Note that, in the undirected graph G(V, E) 950 shown in FIG. 9, link records between a reporter identifier and a target-node identifier are summed up in one link having the combination of end nodes corresponding to these identifiers, and the total of weight values of the summed-up link records is defined as the link weight value $w_{ij}$ of the link. In addition, a link connecting younger nodes is registered in a higher position in the undirected graph G(V, E) 950. In the illustrated example, a younger node has a letter coming earlier in the alphabet. However, in this embodiment, any format for identifying each link may be employed, as long as the information processor can identify the format, and the registration order of the links can be changed in accordance with usage and purpose.

[Spammer Nodes Determination Process]

Figure 10:
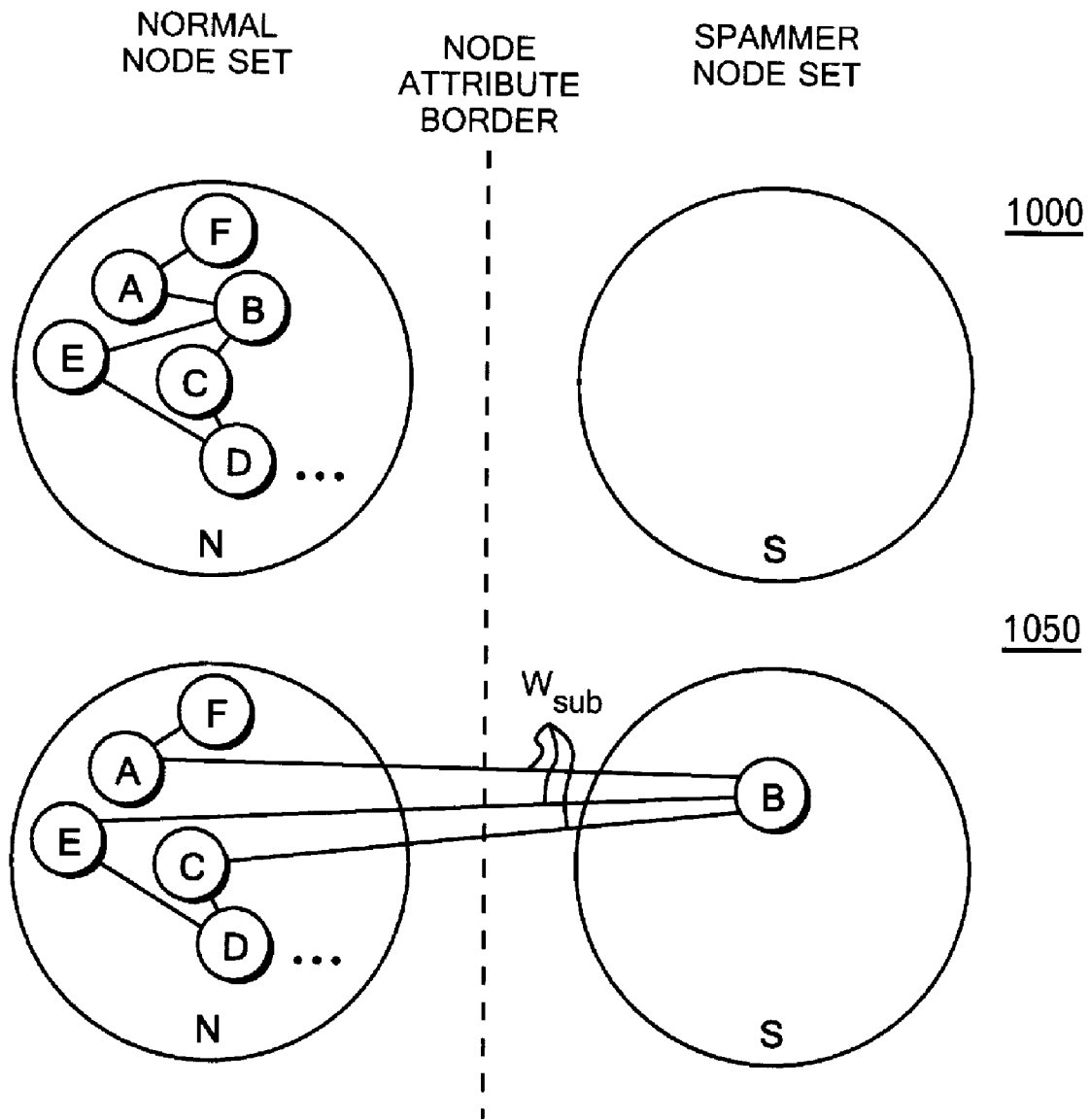
FIG. 10 is a conceptual diagram in which a concept of a spammer node determination process of this embodiment is illustrated using an initial set and a transitional set generated in the spammer node determination process.

FIG. 10 is a conceptual diagram in which a concept of spammer nodes determination process of this embodiment is illustrated using an initial set 1000 and a transitional set 1050. Here, the transitional set 1050 is one generated during the spammer node determination process. The spammer node determination process of this embodiment is implemented on the example of the max-cut computation unit 240 shown in FIG. 2. In the spammer node determination process, in the initial setting, all the nodes related to spammer-reporting actions extracted as the initial set 1000 are regarded as normal nodes, and, as a result, all these nodes are registered in the normal node set N while the spammer node set S is set to empty.

In FIG. 10, nodes A to F are all registered in the normal node set N in the initial setting, while the spammer node set S is initialized to empty. With the progress of the process, spammer nodes are registered into the spammer node set S and deleted from the normal node set N until the number of elements of the spammer node set S reaches the estimated number of spammer nodes. In this process, the transitional set 1050 is generated, links are formed between the normal node set N and the spammer node set S, and a link weight value $w_{sub}$ is assigned to each link. In this embodiment, the process of moving a certain node from the normal node set N to the spammer node set S is performed using a solver selected from the integer programming solver, the semidefinite programming solver and the greedy solver. This solver selection is made based on the total number of target nodes and in consideration of accuracy and scalability of the process.

Regardless of which solver is used, the basic concept of the process is to classify nodes into the normal set N and the spammer node set S so as to maximize a difference between the following two sums: the sum of link weight values assigned to links bridging these different attribute sets; and the sum of link weight values assigned to links formed within the respective attribute sets. Specifically, in the process, the user attributes of the nodes are classified, and thus the nodes are moved so that the sum of the link weight values of the links bridging the different attribute sets can be increased, and that, at the same time, the sum of the link weight values of the links formed within the respective attribute sets can be reduced. In this embodiment, the term "max cut" means such a process of generating two node sets of different user attributes, that is, the normal node set N and the spammer node set S, as to maximize an indicator value calculated focusing on link weight values of links bridging these sets of different user attributes in classifying user attributes of nodes into these sets.

In this embodiment, when the max-cut computation is implemented with the integer programming solver, the integer programming solver adopts the following indicator function (3), and uses, as an objective function, the summation of the indicator functions (3) for the respective nodes.

[Formula 3]

$$\text{Index Function} = (1 - x_i x_j) w_{ij} \quad (3)$$

In the above expression, $x_i$ and $x_j$ each are an index value of a node belonging to the entire node set. Depending on whether a node is a normal node or a spammer node, either of positive and negative integers with the same absolute value is assigned to the node as the index value. If a node i is classified in the normal node set N and that a node j is classified in the spammer node set S, then $x_i=1$ for the node i and $x_j=-1$ for the node j. Meanwhile, $w_{ij}$ is a link weight value calculated for the link connecting these nodes.

When the max-cut computation is implemented with the semidefinite programming solver, the semidefinite programming solver defines an n×n real square matrix representing n nodes, where n corresponds to the number of elements of the node set V, as a spam matrix X in the following expression (4). The spam matrix X is an n×n real symmetric matrix to be referred to as a so-called positive semidefinite matrix, in which all diagonal elements are set to 1, and the other elements satisfy $X_{ij}=X_{ji}$.

[Formula 4]

$$X = \begin{pmatrix} 1 & & X_{ij} \\ & \ddots & \\ X_{ji} & & 1 \end{pmatrix} \Bigg|_{\text{: spam matrix } X} \quad (4)$$

Since the direction of each link of nodes is not specified in this embodiment, it can be defined as $X_{ij}=X_{ji}$.

The spam matrix X having the above characteristics is an n×n real symmetric matrix, and thus forms a matrix to which an optimization based on semidefinite programming is applicable ("Semidefinite Programming and Applications, the first part: Introduction to Semidefinite Programming Problem," Masakazu Kojima, Graduate School of Information Science and Engineering, Tokyo Institute of Technology, April 2000, http://www.is.titech.ac.jp/~kojima/articles/SDP0515.pdf).

The semidefinite programming solver of this embodiment defines the following indicator function (5) with the elements of the above spam matrix X in the spammer node determination process.

[Formula 5]

$$\text{Index Function} = (1 - X_{ij}) w_{ij} \quad (5)$$

In the above expression, $X_{ij}$ denotes an element of the i-th row and the j-th column, and $w_{ij}$ denotes a link weight value for the element. The indicator function (5) is used as an objective function in the semidefinite programming, and elements $X_{ij}$ are determined such that the value of the objective function can be maximized. In this way, spammer nodes are determined with the semidefinite programming solver.

In addition, the max-cut computation unit 240 of this embodiment includes the greedy solver. The optimality of the output result obtained from the process with the greedy solver is not so much assured as those with the integer programming solver and the semidefinite programming solver. However, particularly in the case where the number of processing-target nodes is large, the greedy solver allows fast and efficient extraction of such spammer nodes as to provide the max cut, from the spammer-reporting action set (list). Thus, the greedy solver can be preferably employed in the case in which the spammer-reporting action set includes more than a certain number of nodes.

The greedy solver uses the following indicator function (6) to execute the max-cut computation.

[Formula 6]

$$C(u, S, N) = \sum_{v \in N} w_{uv} - \sum_{x \in S} w_{ux} \quad (6)$$

In the above expression (6), $w_{uv}$ denotes a link weight value for a link connecting a node u and a node v, while $w_{ux}$ denotes a link weight value for a link connecting the node u and a node x, where the node u denotes a certain node belonging to the current normal user set N, the nodes v are the other nodes belonging to the current normal user set N, and another node x belong to the current spammer node set S. That is, the indicator function (6) shows the change of the sums of the link weight values assigned to the links caused if the node u in normal user set N were moved to the spammer node set S.

In the greedy method, in every step after the initialization, a node u for which the indicator function (6) returns the positive and largest value is determined from the nodes included in the current normal node set N of the initial setting or the current step. Then, the node u is moved to the spammer node set S. In this way, in each step, such a node as to maximize the value of the indicator function (6) in a greedy sense is selected from the current normal node set N, and moved to the spammer node set S. The spammer-reporting action history set is generated using the extracted nodes and links related to spammer-reporting actions; thus each link means occurrence of one or more spammer-reporting actions between its end nodes. Accordingly, if all the spammer nodes were moved to the spammer node set S, any link locally connecting the nodes within the normal node set N or the spammer node set S might not exist in the ideal case. Thus, in the greedy method, each node u moved from the current normal node set N to the current spammer node set S is selected to satisfy the condition that the indicator function (6) should return the positive and largest value for the node. This means that the user corresponding to the node u is disfavored by most of normal users and disfavored by least of spammer users. Accordingly, it is appropriate to use the indicator function (6) itself as an objective function.

Hereinafter, description will be given of the spammer node determination process of this embodiment by using FIG. 11. The spammer node determination process starts at step S1100, and the max-cut computation unit 240 obtains the undirected graph G(V, E) in step S1101. In step S1102, the max-cut computation unit 240 obtains the estimated number of spammer nodes in undirected graph G(V, E) from an appropriate storage area. The estimated number of spammer nodes varies depending on service details provided by the application server 122. For example, when the application server 122 provides a service such as SNS or blog, the spammer ratio is known to some extent.

NIFTY Corporation (Nifty Research Institute) researched the spam blog ratio by sampling a hundred thousand articles per month from the blog articles selected as analysis targets of "BuzzPulse," in the period from October 2007 to February 2008. As a result, it is known that spam blogs make up approximately 40% on an average of these five months (http://www.nifty.co.jp/cs/07shimo/detail/080326003337/1.htm). As described above, such a statistical analysis over a certain period allows the estimated number (ratio) of spammer nodes to be obtained as a value depending on a service provided by the application server 122, such as SNS, mail delivery or blog. The estimated number of the spammer nodes obtained as above may be included in the program, or may be stored as a lookup table and employed as part of initial setting when the program is activated to operate. The latter method allows flexible application of the spammer node determination process to various services.

In step S1104, the max-cut computation unit 240 determines whether or not the number of the nodes included in the undirected graph G(V, E) is not more than the first threshold, by referring to, for example, the number of entries of the node set V. The first threshold can be preset appropriately in accordance with hardware resource such as CPU performance and memory capacity of each of the information processors as the server and the like to be used, and thus is not particularly limited. In a certain example illustrated herein, the first threshold is set as (the total number of nodes)=100, as an example. If the size of the undirected graph G(V, E) is determined to be not more than the first threshold (yes) in step S1104, the max-cut computation unit 240 invokes the integer programming solver to partition the nodes of the undirected graph G(V, E) into two max-cut sets in step S1105.

On the other hand, if the total number of the nodes of the undirected graph G(V, E) is determined to exceed the first threshold (no) in step S1104, the max-cut computation unit 240 determines whether or not the total number of the nodes of the undirected graph G(V, E) is not more than the second threshold. If the total number of the nodes of the undirected graph G(V, E) is determined to be not more than the second threshold (yes), the max-cut computation unit 240 invokes the semidefinite programming solver to partition the nodes of the undirected graph G(V, E) into two max-cut sets in step S1108. The second threshold can also be preset appropriately in accordance with hardware resource such as CPU performance and memory capacity of each of the information processors as the server and the like to be used. In a certain example illustrated herein, the second threshold is set as (the total number of nodes)=1000, as an example.

On the other hand, if the total number of the nodes of the undirected graph G(V, E) is determined to exceed the second threshold (no) in step 1107, the max-cut computation unit 240 invokes the greedy solver to partition the nodes of the undirected graph G(V, E) into two max-cut sets in step S1109. After generating the max-cut sets by partitioning the nodes of the undirected graph G(V, E) into two in either step S1105, S1108 or S1109, the max-cut computation unit 240 outputs these max-cut sets as a spammer node set S and a normal node set N in S1106, and the process ends at step S1110. Hereinbelow, description will be given of implementations of the solvers.

[Integer Programming Solver]

Figure 11:
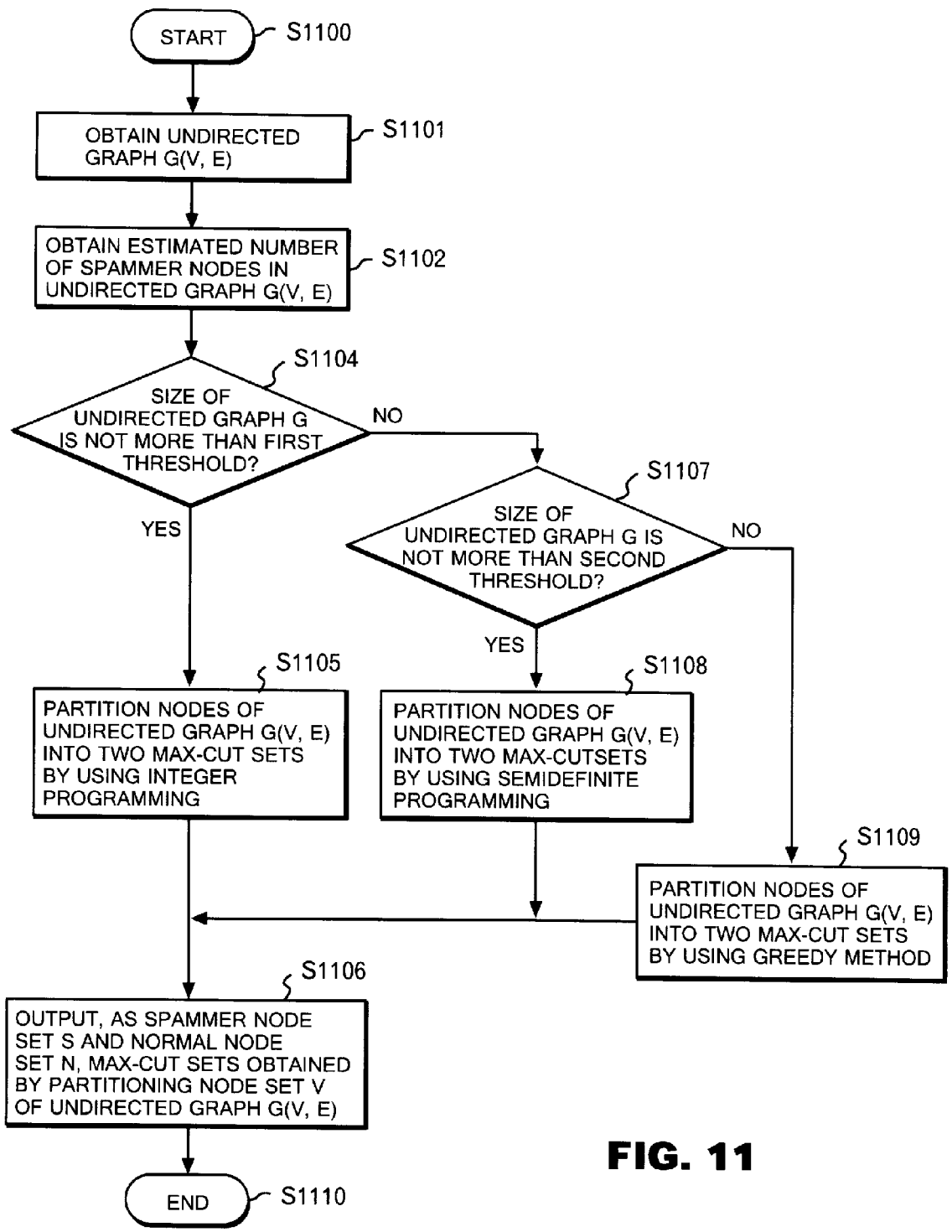
FIG. 11 is a flowchart of the spammer node determination process.

FIG. 12 shows an example of a spammer criterion formula implemented on the integer programming solver used in the process shown in FIG. 11. As shown in FIG. 12, the integer programming solver in this embodiment is formulated including the indicator function (3) and the following constraint: the processing-target nodes must be classified into the normal node set N and the spammer node set S so that the size of the normal node set N must be (n−n⁻) or more and the size of the spammer node set S must be n⁻ or less. In other words, the constraint is employed that the size difference between these sets N and S must be (n−2n⁻) or more. In the objective function shown in FIG. 12, if the node j is a spammer node, $x_j=-1$, while if the node i is a normal node, $x_i=+1$. As a result, if the nodes i and j belong to the same attribute set, then the product of their index values $x_i x_j=1$ and thus the value of the indicator function (3) becomes 0. Accordingly, the objective function shown in FIG. 12 returns a positive value $2w_{ij}$ only when the nodes i and j respectively belong to the different attribute sets. Note that, in this embodiment, the direction between the nodes i and j is not specified. However, with the objective function shown in FIG. 12, the computation result includes the values for both $x_i x_j$ and $x_j x_i$. Accordingly, the objective function is added with a normalization constant=¼ as shown in FIG. 12 such that the sum obtained therewith can be normalized. The user attributes of nodes are classified so as to maximize the value of the above objective function under the constraints, and the resultant value of the objective function is used as an indicator value of max-cut computation.

In the above example, the node set is partitioned into a spammer node set S and a normal node set N by using the integer programming solver such that the value of the indicator function (3) can be maximized under a size constraint. However, the constraint used here may be another constraint, such as that several nodes especially designated by the administrator from known spammer nodes must be included in the spammer node set S. Here, the known spammer nodes are ones previously determined by the administrator in some other way. Basically, any function that can be represented as linear combination of the index values $x_i$ of the nodes i may be employed as a constraint in the maximization of the indicator function (3).

In the example shown in FIG. 12, the integer programming assures to successfully generate the normal node set N and the spammer node set S satisfying the max cut in completing the processing of the node set V. However, the integer programming involves multiplication of $x_i$ by $x_j$ to accurately register spammer nodes into the spammer node set S. As a result, the above accurate registration requires computational complexity as high as the so-called quadratic programming. This means that the integer programming solver requires large amount of computational time and memory usage along with the increase in the number of nodes. Thus, in this embodiment, the max-cut solver to be invoked should preferably be selected depending on the first threshold preset in accordance with the capacity of the employed hardware resource.

[Semidefinite Programming Solver]

FIG. 13 shows an example of a spammer criterion formula implemented on the semidefinite programming solver. In this embodiment, depending on the total number of nodes, the semidefinite programming solver is invoked as a max-cut solver in place of the integer programming solver. This objective function is configured by including the above indicator function (4), where $X_{ij}$ is an element of the spam matrix X. As described above, $X_{ij}=1$ for each diagonal element while $X_{ij}$ is set to any real value satisfying $X_{ij}=X_{ji}$ for each non-diagonal element. The semidefinite programming solver involves computational complexity of substantially not less than the cube of the total number of nodes. This computational complexity is lower than that of the integer programming, but the time complexity thereof increases at an accelerated rate as the number of nodes increases.

Note that, in the semidefinite programming solver, an n×n symmetric matrix E is introduced in which all the elements are 1, and the constraint of Trace(EX)≧(n−2n⁻)² exists for the objective function. The above constraint is introduced in view of dimensions of the product of the matrices E and X. This introduction enables such a partition as to make the size of the normal node set N to be (n−n⁻) or more and as to make the size of the spammer node set S to be n⁻ or less, that is, such a partition as to make the size difference between these sets N and S to be (n−2n⁻) or more. As an output of the semidefinite programming, the real symmetric matrix X is obtained. However, in addition, the attributes of the nodes need to be extracted from this n×n matrix X of solution. Unlike the integer programming and the greedy method, in which an attribute of a node i is determined based on whether the parameter $x_i$ is 1 or −1, an attribute of a node i is determined based on $X_i$, the i-th row of the matrix X in the semidefinite programming. The method of extracting 1 or −1 from each row of a matrix is usually called rounding or random projection. Though there are many procedures for the method, the following simple procedure may be employed, for example. First, for each node i, the sum $S_i = X_{i1} + X_{i2} + \ldots + X_{in}$ of the elements in the i-th row is calculated. Here, the sum $S_i$ corresponds to an index value of the node i. Then, the nodes are sorted in ascending order of the sums, and the first n⁻ nodes are classified into the spammer node set S while the other nodes are classified into the normal node set N.

In the above example, the node set is partitioned into a spammer node set S and a normal node set N using the semidefinite programming solver such that the value of the indicator function (5) can be maximized under the size constraint. However, the constraint used here may be replaced or added by another constraints, such as that several nodes especially designated by the administrator from known spammer nodes must be included in the spammer node set S. Here, the known spammer nodes are ones previously determined by the administrator in some other way. Basically, any function that can be represented as linear combination of the elements $X_{ij}$ of the index values $X_i$ of the nodes i may be employed as a constraint in the maximization of the indicator function (5).

[Greedy Solver]

Figure 14:
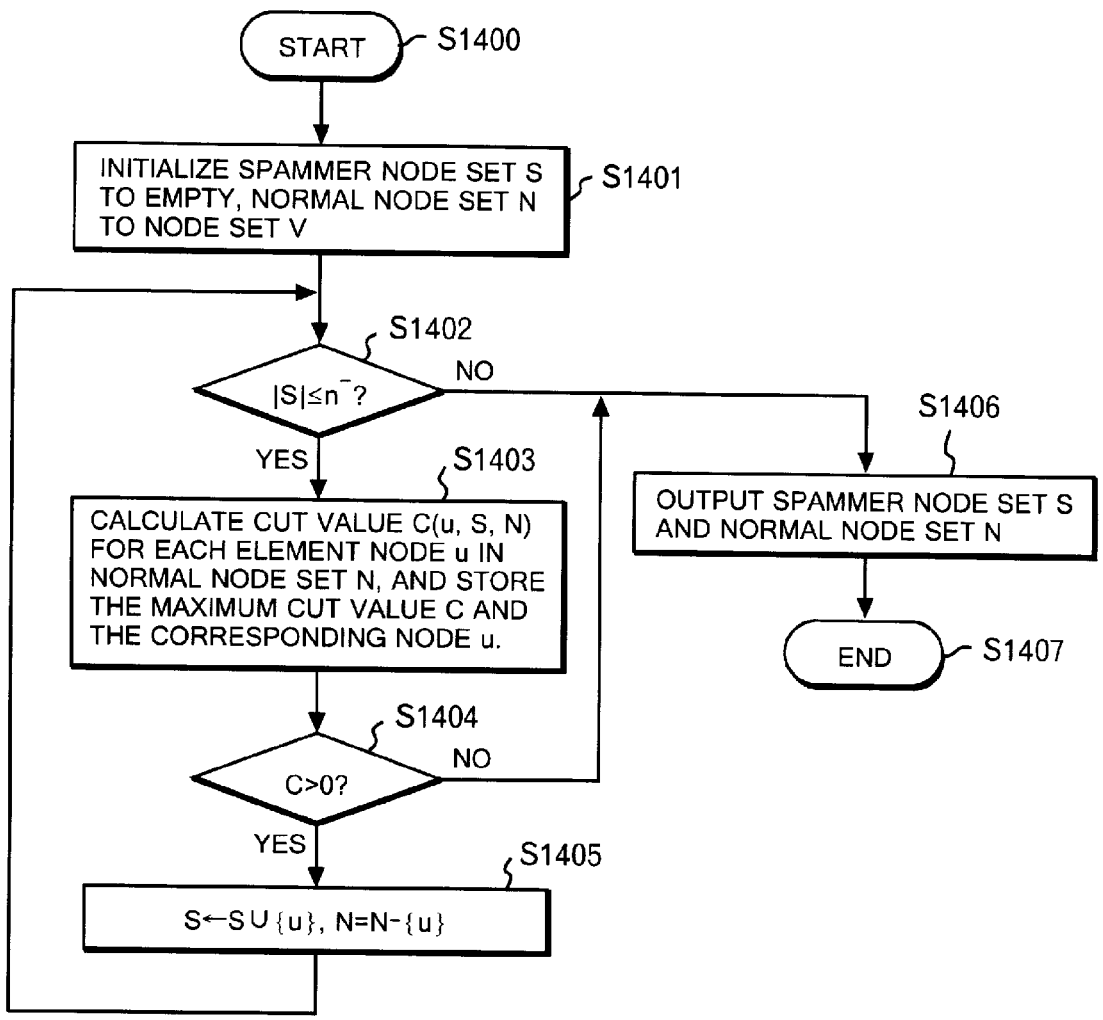
FIG. 14 is a flowchart showing a process performed by a greedy solver implementation of the max-cut solvers.

FIG. 14 is a flowchart showing a process performed by the greedy solver, which is one of the implementations of the max-cut solvers. The process shown in FIG. 14 starts at step S1400, and the greedy solver initializes the spammer node set S to empty and the normal node set N to the node set V, in step S1401. In this step, all the nodes are set as normal nodes for initialization.

In step S1402, the greedy solver determines whether or not the number of the nodes of the spammer node set S is not more than the estimated number n⁻ of spammers. If the number of the nodes of the spammer node set S is not more than the estimated number n⁻ of spammers (yes), the greedy solver calculates, for each node u in the normal node set N, the cut value C(u, S, N) used as an indicator value for the node, in step S1403. Thereby, such a node u as to maximize the cut value C (this is identical to the indicator shown in the expression (6)) is determined. If the cut value C is positive (yes) in step S1404, the greedy solver adds the currently-processed node u to the spammer node set S and, at the same time, deletes this node u from the normal node set N in step S1405. This step corresponds to updating the spammer node set S and the normal node set N as to provide max-cut sets. After step S1405 is completed, the process returns to step S1402 to repeat the process.

If the cut value C is not positive (no) in step S1404, that is, if any potential spammer node is not found from the normal node set N, the process branches to step S1406. In step S1406, the greedy solver outputs the spammer node set S and the normal node set N. After that, the process ends at step S1407.

In addition, if the number of the nodes |S| of the spammer node set S exceeds the estimated number n⁻ (no) in step S1402, the greedy solver outputs the spammer node set S and the normal node set N in step S1406. After that, the process ends at step S1407. The greedy solver as shown in FIG. 14 maximizes the cut value step by step by arbitrarily extracting a node u from the normal node set N. This means that the greedy solver involves computational complexity of as low as approximately $O(n^2)$, and thus the greedy solver achieves a higher speed than the semidefinite programming in terms of computational complexity.

In the above example, the node set is partitioned into a spammer node set S and a normal node set N using the greedy solver such that the value of the indicator function (6) can be maximized under the size constraint. However, other constraints than the one used here may added to, or may replace the constraint used here. For example, several nodes especially designated by the administrator from known spammer nodes could be included in the spammer node set S. Here, the known spammer nodes are ones previously determined by the administrator in some other way. Basically, any function that can be represented using the index values $x_i$ of the nodes i may be employed as a constraint in the maximization of the indicator function (6).

Hereinafter, description will be given of another example of the process performed by the greedy solver. In this example, the efficiency in the process is improved by considering spam levels of nodes at the initial setting. Specifically, in this example to be illustrated herein, a node is not arbitrarily selected as a processing target node u at the initial setting, but the node to which the most links are concentrated, that is, the node with the highest spam level, is selected from the initial normal node set N. This improves the efficiency in maximizing the cut value C by moving the node with the highest spam level from the normal node set N to the spammer node set S.

For example, the node with the highest spam level used in this example may be, for example, the node B registered in the undirected graph G(V, E) in FIG. 6 or in the data table 900 in FIG. 9. In the process performed by the greedy solver shown in FIG. 14, calculating the cut value C by prioritizing the selection of the node B will allow the subsequent iterative calculation to efficiently maximize the cut value C, and thus help the greedy solver to more efficiently generate max-cut sets. In still another related example, the nodes may be registered in descending order of the number of links concentrating thereto, and selectively inputted in the process in step S1403 of FIG. 14, and thereby the max-cut sets can be generated even more efficiently.

Figure 15:
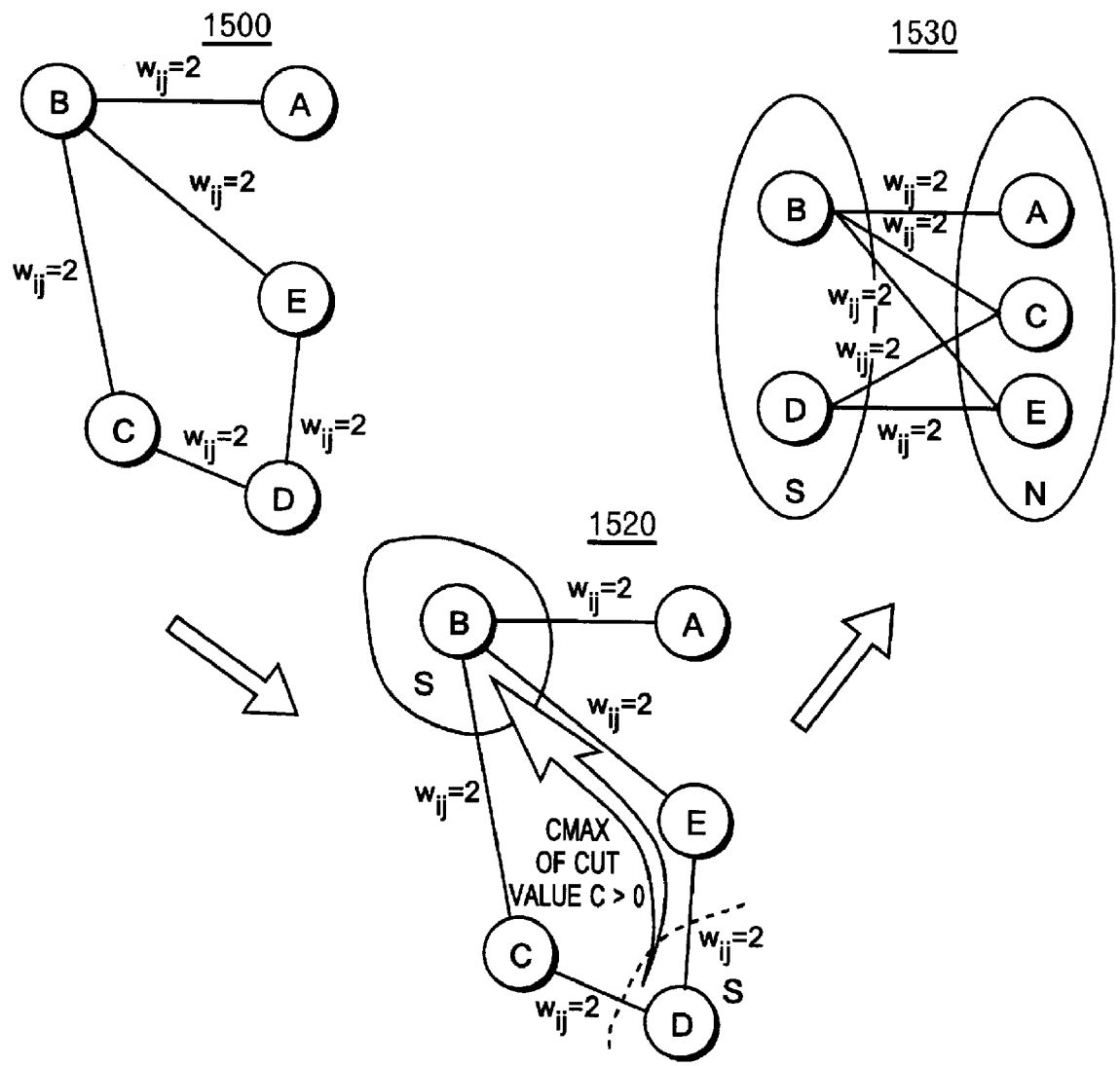
FIG. 15 is a diagram illustrating the user attribute determination process performed when the greedy solver is employed.

FIG. 15 is a diagram illustrating the user attribute determination process performed when the greedy solver is employed, where the diagram is corresponding to the flowchart of FIG. 14. An undirected graph 1500 includes nodes A to E. Here, for each of the nodes A, C, D and E, which are elements of the current normal node set N, the cut value C obtained when the node is added to the current spammer node set S (to which the node B has already added) is calculated. Here, the cut value C for the nodes A, C, D and E are 0−2=−2, 2−2=0, 4−0=4 and 2−2=0, respectively. Since the maximum cut value C is positive, the node D corresponding to it is newly registered into the spammer node set S.

Thereafter, for each of the nodes A, C and E, which are elements of the current normal node set N, the cut value C is calculated again. As a result, since none of the cut values C is positive, the spammer user set S including the nodes B and D is obtained.

Figure 16:
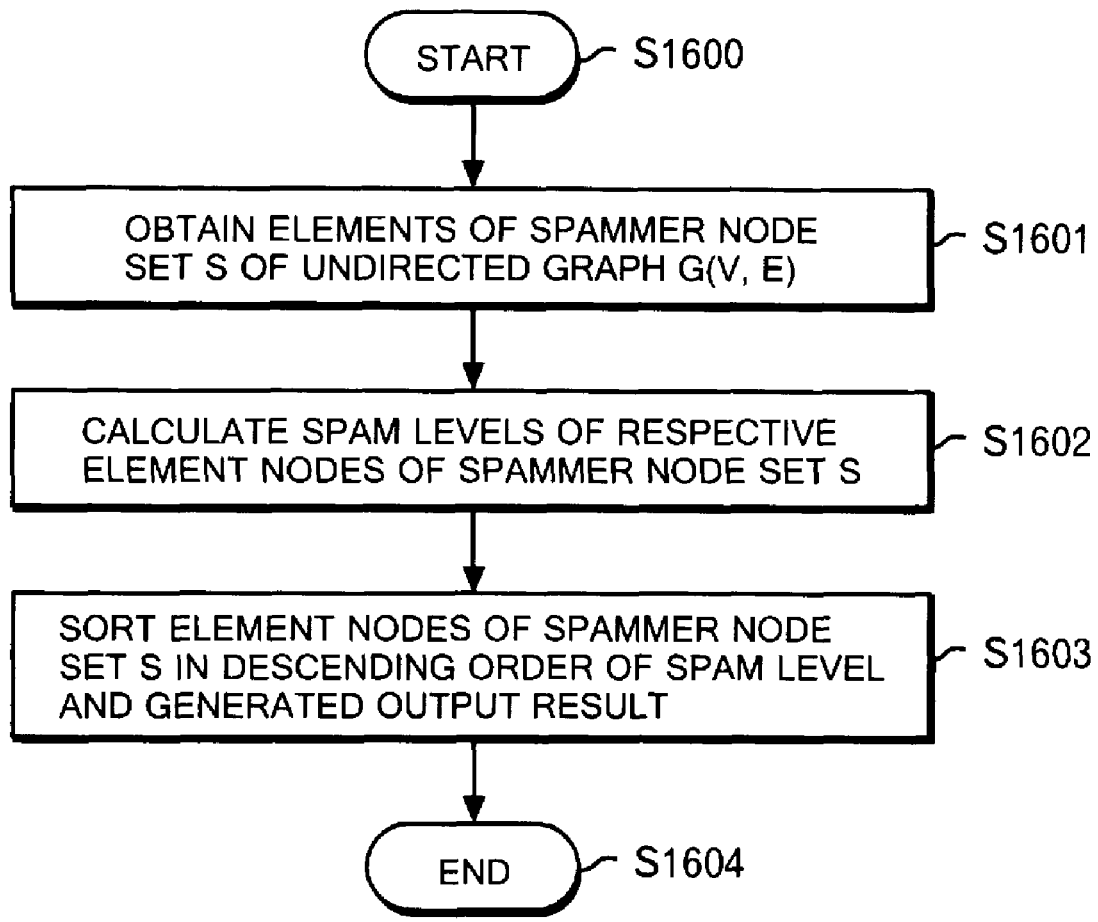
FIG. 16 is a flowchart showing a spammer information generation process performed by the analysis server after spammer nodes are determined.

FIG. 16 is a flowchart showing a spammer information generation process performed by the analysis server 126 of this embodiment after the spammer nodes are determined. The process shown in FIG. 16 starts at step S1600, and the analysis server 126 obtains the spammer node set S from the max-cut sets in step S1601. Then, the analysis server 126 obtains spam levels $W_k$ of the respective elements of the spammer node set S by using the above expression (2) in step S1602. Here, if the spam levels $W_k$ are previously calculated, the analysis server 126 obtains the spam levels $W_k$ by reading out these calculated values from the memory in step S1602.

In step S1603, the analysis server 126 sorts the element nodes of the spammer node set S in descending order of spam level, and lists these sorted elements to generate a spammer list as an output result. After that, the process ends at step S1604.

EXAMPLES

Hereinafter, the present invention will be further described with reference to specific examples and the results shown in FIGS. 17 to 20. Note that the following examples are described for illustrating the present invention, and thus do not limit the present invention.

[Hardware Implementation]

The program for executing the spammer node determination process of this embodiment was installed in a personal computer produced by International Business Machines Corporation including Windows (registered trademark) XP as the operating system, and the processing performance thereof was reviewed. The program for executing the spammer node determination process was described in PYTHON, a script language.

[Data Implementation]

The following assumptions were employed in the following Examples. The number of contents posted by normal nodes in an investigation-target period is represented by a normal distribution $N(\alpha, \sigma)$, where a denotes an average number of posted contents and α denotes its standard deviation. In addition, a content posted by a normal node is deleted by another normal node (because of a feud between them, or the like) with a probability pn. However, the probability pn is lower than a probability ps with which a content posted by a spammer node is deleted. Meanwhile, a content posted by a spammer node is deleted with the probability ps far higher than pn, and the number of contents posted by spammer nodes in the investigation-target period is represented by an exponential distribution $Exp(\lambda)$, where λ denotes an average number of posted contents. When a content posted by a spammer node is deleted by a normal node, the spammer node retaliates by taking a spammer-reporting action to the normal node with a probability of 1.0, 0.5 or 0.0 to increase the spam level of the normal node.

EXAMPLES AND COMPARATIVE EXAMPLES

In each Example, among the spammer node determination processes according to the present invention, the process was implemented with the greedy method (hereinafter, referred to as SDwMC, Spammer Detection with MaxCut method) for obtaining the max cut. Through this process, spammer node sets S were outputted with the existence ratio of spammer nodes varied, under the conditions shown in FIG. 17. Examples and Comparative Examples were evaluated based on the ratio of known spammer nodes in output results, where the known spammer nodes were preset beforehand. In each Example, the max-cut solver was implemented as the greedy solver. FIG. 17 shows the detailed conditions of the data implementation employed in Examples and Comparative Examples.

In each Comparative Example, the data implementation similar to Examples was employed, and the ratio of spammer nodes in the spammer node set S was generated by a Point method. The Point method is a spam level calculation method in which, if a node A reports a node B as a spammer or deletes a content posted by the node B, the spam level of the node B is added by 1. Thereafter, nodes with higher spam levels are registered into a spammer node set S in descending order of spam level, and thus the spammer node set S is generated.

FIG. 18 shows the results of Example 1 and Comparative Example 1 in each of which spammer nodes always take retaliatory actions. FIG. 19 shows the results of Example 2 and Comparative Example 2 in each of which spammer nodes never take any retaliatory actions. FIG. 20 shows the results of Example 3 and Comparative Example 3 in each of which spammer nodes take retaliatory actions with the probability of 0.5. As is clear from FIG. 18 to 20, the spammer node extraction rate (performance) of the SDwMC method in this embodiment increased with the increase in the existence ratio of spammer nodes and in the probability of retaliatory actions, more significantly than that of the Point method.

Meanwhile, according to FIG. 19 showing Example 2 and Comparative Example 2, the extraction rate of the Point method was higher than the SDwMC method under the condition that no retaliatory action occurred and the spammer ratio was small. FIG. 19 also shows that the extraction rate increased in Example 2 with the increase in the existence ratio of spammer nodes. As described above, in the case where spammer nodes never take any retaliatory action as in Example 2, spammer nodes are definitely distinguished from normal nodes so that the Point method might perform well in this case. However, the SDwMC method provided a good extraction performance in a range of high existence ratios of spammer nodes even in such a case. This shows that the SDwMC method can be favorably applied to services such as blog, SNS, message board and chat services even in such a case. Moreover, the greedy solver allowing nodes with high spam levels to be prioritized as processing targets may be additionally employed in Example 2, and this employment will be able to compensate for reduction in extraction performance where the existence ratio of spammer nodes is low.

According to FIG. 20 showing Example 3 and Comparative Example 3, no significant difference is found between the performances of the SDwMC method and the Point method where the spammer ratio was small, but the extraction rate of the SDwMC method according to the present invention increased more significantly than the Point method where the existence ratio of spammer nodes is large, as in the case of Examples 1 and 2.

As is clear from the above Examples and Comparative Examples, the present invention enables efficient extraction of spammer nodes in Web services expected to have high existence ratios of spammer nodes, such as blog, SNS, chat and message board services, and thus makes it possible to efficiently extract malicious spammers to interfere with network activities of normal users from an enormous number of transactions. Moreover, the present invention requires neither analysis of messages of contents nor previous generation of answer sets, but can detect spammer nodes only using activities between nodes in network transactions. This means that the present invention can improve the efficiency in spammer extraction of the analysis server 126.

In this embodiment, each of the integer programming solver, the semidefinite programming solver and the greedy solver functions as a max-cut solver. In the above description, this certain embodiment of the present invention uses these three solvers, the integer programming solver, the semidefinite programming solver and the greedy solver. However, consider the case where the information processor implementing the present invention has sufficient hardware resource such as CPU performance and memory capacity, or the case where obtaining a digest of spammer nodes has priority in guaranteeing mathematical accuracy of the max cut. In such cases, the max-cut solvers need not be switched according to the total number of nodes, and thus another embodiment of the present invention may use a single solver selected from the integer programming solver, the semidefinite programming solver and the greedy solver. In still another embodiment, as the max-cut solver, an appropriate combination of solvers selected from the above three solvers can be used on the information processor.

The aforementioned functions of this embodiment can be implemented as a device-executable program described in such a language as an object-oriented programming language. The language used here may be C++, Java (registered trademark), Java (registered trademark) Beans, Java (registered trademark) Applet, Java (registered trademark) Script, Perl, Ruby, Python or the like. The program can be distributed in a form stored in a device-readable recording medium, such as a hard disk device, a CD-ROM, an MO, a flexible disk, an EEPROM or an EPROM, or can be transmitted over a network in a format supported by other devices.

The present invention makes it possible to provide a technique for distinguishing spammer nodes from the other non-spammer nodes among multiple nodes connected to a network without preparing any answer set in advance. The present invention also makes it possible to provide an information processor, an information processing system, an information processing method and a program for classifying each of user attributes of nodes accessing an application server as either a normal node or a spammer node by using an access log to the application server, regardless of direct reports from nodes. Specifically, the classification is made based on activity history of nodes including activities such as content deletion, regardless of presence or absence of a program allowing the marking of spam messages or a program allowing the direct spammer-node reporting to an administrator.

Hereinabove, description has been given of this embodiment, but the present invention is not limited to the above embodiment. Within the range appreciated by those skilled in the art, this embodiment may be modified by addition, change, deletion or the like, and another embodiment is also possible. Any implementation that provides the effects and advantages of the present invention should be included in the scope of the present invention.

What is claimed is:

1. An information processor for classifying user attributes of a plurality of nodes connected to a network, the information processor comprising:
an action history obtaining unit for extracting access log records designated as spammer-reporting actions from an access log and generating therefrom a spammer-reporting action history set, the spammer-reporting action history set including action identifiers of the respective spammer-reporting actions, reporter identifiers, and target identifiers indicating targets of the respective spammer-reporting actions;
a related node obtaining unit for generating a node set and a link set from the spammer-reporting action history set, the node set including, as elements thereof, nodes related to the spammer-reporting actions, and the link set including, as elements thereof, links and action weight values assigned to the respective links, each links connecting two of the nodes related to the spammer-reporting actions;
a graph generation unit for generating a graph from the node set and the link set by registering a set of links connecting each pair of nodes as an edge in association with its link weight value obtained by summing up the action weight values assigned to the set of links connecting the pair of nodes; and
a max-cut computation unit for classifying the nodes constituting the graph into two sets so as to maximize an indicator value defined by the sum of the link weight values assigned to edges bridging the two sets.

2. The information processor according to claim 1, further comprising:
a spammer-reporting action defining unit;
wherein the action history obtaining unit extracts records in which the spammer-reporting actions are registered, by referring to the action identifiers of the respective spammer-reporting actions registered in the spammer-reporting action defining unit and registers the records into the spammer-reporting action history set.

3. The information processor according to claim 1, wherein the max-cut computation unit uses an integer programming for computing a max cut for classifying the user attributes to maximize the indicator value by assigning either of positive and negative values with the same absolute value to each of the nodes depending on which of the different two sets the node is classified into.

4. The information processor according to claim 1, wherein:
the max-cut computation unit is configured to use a semidefinite programming solver, and
the semidefinite programming solver is configured to compute a max cut for classifying the user attributes of the nodes by defining a symmetric matrix corresponding to the nodes and by generating the index value from values of elements of the symmetric matrix.

5. The information processor according to claim 1, wherein:
the max-cut computation unit is configured to include a greedy solver, and
the greedy solver is configured to compute a max cut by generating the indicator value by using a difference between: (i) the sum of link weight values assigned to the edges bridging the two sets; and (ii) the sum of link weight values assigned to the other edges that are locally existing within each of the two sets.

6. The information processor according to claim 1, wherein:
the max-cut computation unit is configured to use an integer programming solver, a semidefinite programming solver, and a greedy solver, wherein:
the integer programming solver is configured to compute a max cut for classifying the user attributes so as to maximize the indicator value by assigning either of positive and negative values with the same absolute value to each of the nodes depending on whether the node is classified into either of the different two sets;
the semidefinite programming solver is configured to compute a max cut for classifying the user attributes of the nodes by defining a symmetric matrix corresponding to the nodes, and by generating the index value from values of elements of the symmetric matrix;

the greedy solver is configured to compute a max cut by generating the indicator value by using a difference of: the sum of link weight values assigned to the edges bridging the two sets; and the sum of link weight values assigned to the other edges that are locally existing within each of the two sets; and the information processor is configured to perform the max-cut computation by selecting one from among the three different solvers in accordance with the number of processing-target nodes.

7. The information processor according to claim 1, wherein the graph generation unit is undirected in order to generate undirected graphs, the information processor further comprising:

an application server for receiving access requests from the nodes over the network and responding to the access requests;

an analysis server for classifying user attributes of each of the plurality of nodes as either a normal node or a spammer node by analyzing an access log to the application server, the normal node accessing the network on a bona fide basis, the spammer node accessing the network out of malice, and;

a result output unit for outputting, as a result output, a spammer list generated from a set, including the spammer nodes, of the two sets generated by the max-cut computation unit.

8. The information processor according to claim 1 wherein:

the max-cut computation unit is configured to use an integer programming solver, and the integer programming solver is configured to compute a max cut for classifying the user attributes so as to maximize the indicator value by assigning either of positive and negative values with the same absolute value to each of the nodes depending on whether the node is classified into either of the different two sets.

9. The information processor according to claim 1 wherein:

the max-cut computation unit is configured to use a semidefinite programming solver for computing a max cut for classifying the user attributes of the nodes by defining a symmetric matrix corresponding to the nodes, and by generating the index value from values serving as elements of the symmetric matrix.

10. The information processor according to claim 1 wherein:

the max-cut computation unit includes a greedy solver for computing a max cut by generating the indicator value by using a difference between: (i) the sum of link weight values assigned to edges, bridging the two sets, of the links; and (ii) the sum of link weight values assigned to the other edges, locally existing within the two respective sets, of the links.

11. The information processor according to claim 1 wherein:

the max-cut computation unit is configured to use an integer programming solver, a semidefinite programming solver, and includes a greedy solver, wherein:

the integer programming solver is configured to compute a max cut for classifying the user attributes so as to maximize the indicator value by assigning either of positive and negative values with the same absolute value to each of the nodes depending on whether the node is classified into either of the different two sets;

the semidefinite programming solver is configured to compute a max cut for classifying the user attributes of the nodes by defining a symmetric matrix corresponding to the nodes, and generating the index value by using values serving as elements of the symmetric matrix;

the greedy solver is configured to compute a max cut by generating the indicator value by using a difference of: the sum of link weight values assigned to edges, bridging the two sets, of the links; and the sum of link weight values assigned to the other edges, locally existing within the two respective sets, of the links; and the information processing system is configured to perform the max-cut computation by selecting one from among the three different solvers in accordance with the number of processing-target nodes.

12. The information processor according to claim 1 wherein the analysis server is a management module of the application server.

13. An information processing method performed by an information processor for classifying user attributes of a plurality of nodes connected to a network, the method comprising the steps of:

generating a spammer-reporting action history set by extracting, from an access log memory, access log records designated as spammer-reporting actions, the spammer-reporting action history set including action identifiers of the respective spammer-reporting actions, reporter identifiers, and target identifiers indicating targets of the respective spammer-reporting actions;

generating a node set and a link set from the spammer-reporting action history set, the node set including, as elements, nodes related to the spammer-reporting actions among the nodes, and the link set including, as elements, link and action weight values assigned to the respective links, each link connecting two of the nodes related to the spammer-reporting actions; and generating a graph from the node set and the link set by registering a set of links connecting each pair of nodes as an edge in association with its link weight value obtained by summing the action weight values assigned to the set of links connecting the pair of nodes; and classifying the nodes constituting the graph into two exclusive sets that do not commonly include any elements to maximize an indicator value defined by the sum of the link weight values assigned to ones bridging the two sets of the links, thereby classifying user attributes of a plurality of nodes connected to a network.

14. The information processing method according to claim 13, further comprising the step of:

defining spammer-reporting actions, wherein the step of generating a spammer-reporting action history set further comprising the steps of: extracting records in which the spammer-reporting actions are registered, from the access log by referring to the action identifiers of the respective spammer-reporting actions registered in the step of defining spammer-reporting actions;

and registering the records into the spammer-reporting action history set.

15. The information processing method according to claim 13, wherein the classifying step further includes computing a max cut for classifying the user attributes so as to maximize the indicator value by assigning either of positive and negative values with the same absolute value to each of the nodes depending on whether the node is classified into either of the different two sets.

16. The information processing method according to claim 13, wherein the classifying step further comprises computing a max cut for classifying the user attributes of the nodes by defining a symmetric matrix corresponding to the nodes, and by generating the index value from values serving as elements of the symmetric matrix.

17. The information processing method according to claim 13, wherein the classifying step further comprises computing a max cut by generating the indicator value by using a difference of: the sum of link weight values assigned to edges, bridging the two sets, of the links; and the sum of link weight values assigned to the other edges, locally existing within the two respective sets, of the links.

18. The information processing method according to claim 13, wherein the classifying step further comprises:
  invoking, in accordance with the number of processing-target nodes, one step selected from the group consisting of:
    computing a max cut for classifying the user attributes so as to maximize the indicator value by assigning either of positive and negative values with the same absolute value to each of the nodes depending on whether the node is classified into either of the different two sets;
    computing a max cut for classifying the user attributes of the nodes by defining a symmetric matrix corresponding to the nodes, and by generating the index value from values serving as elements of the symmetric matrix; and
    computing a max cut by generating the indicator value by using a difference of: the sum of link weight values assigned to edges, bridging the two sets, of the links; and the sum of link weight values assigned to the other edges, locally existing within the two respective sets, of the links.

19. A non-transitory, computer readable storage medium tangibly embodying information processor readable instructions which, when performed, cause an information processor to perform the steps of:
  generating a spammer-reporting action history set by extracting, from an access log memory, access log records designated as spammer-reporting actions, the spammer-reporting action history set including action identifiers of the respective spammer-reporting actions, reporter identifiers, and target identifiers indicating targets of the respective spammer-reporting actions;
  generating a node set and a link set from the spammer-reporting action history set, the node set including, as elements, nodes related to the spammer-reporting actions among the nodes, and the link set including, as elements, link and action weight values assigned to the respective links, each link connecting two of the nodes related to the spammer-reporting actions; and
  generating a graph from the node set and the link set by registering a set of links connecting each pair of nodes as an edge in association with its link weight value obtained by summing the action weight values assigned to the set of links connecting the pair of nodes; and
  classifying the nodes constituting the graph into two exclusive sets that do not commonly include any elements to maximize an indicator value defined by the sum of the link weight values assigned to ones bridging the two sets of the links, thereby classifying user attributes of a plurality of nodes connected to a network.

* * * * *